(12) United States Patent
Seshadri et al.

(10) Patent No.: US 7,360,202 B1
(45) Date of Patent: Apr. 15, 2008

(54) USER INTERFACE SYSTEM AND METHODS FOR PROVIDING NOTIFICATION(S)

(75) Inventors: Praveen Seshadri, Bellevue, WA (US); Shahaf Abileah, Seattle, WA (US); Niranjan Nilakantan, Redmond, WA (US); Holly Knight, Woodinville, WA (US); Shyamalan Pather, Seattle, WA (US); Robert H. Gerber, Bellevue, WA (US); Charles Tete Mensa-Annan, Bellevue, WA (US); Philip Garrett, Woodinville, WA (US); Michael Anthony Faoro, North Bend, WA (US); Darryn Owen Lavery, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 502 days.

(21) Appl. No.: 10/375,300

(22) Filed: Feb. 27, 2003

Related U.S. Application Data

(63) Continuation-in-part of application No. 10/180,360, filed on Jun. 26, 2002.

(51) Int. Cl.
*G06F 9/44* (2006.01)
(52) U.S. Cl. .................................... 717/106
(58) Field of Classification Search ........ 717/103–109, 717/127–129, 132, 110; 715/762–764; 719/315
See application file for complete search history.

(56) References Cited

U.S. PATENT DOCUMENTS

| | | | |
|---|---|---|---|
| 4,774,658 A | 9/1988 | Lewin | |
| 5,367,633 A * | 11/1994 | Matheny et al. | ............ 715/764 |
| 5,416,725 A | 5/1995 | Pacheco et al. | |
| 5,555,346 A | 9/1996 | Gross et al. | |
| 5,813,007 A | 9/1998 | Nielsen | |
| 5,852,812 A | 12/1998 | Reeder | |
| 5,893,091 A | 4/1999 | Hunt et al. | |
| 5,973,612 A | 10/1999 | Deo et al. | |
| 5,974,406 A | 10/1999 | Bisdikian et al. | |
| 5,999,978 A | 12/1999 | Angal et al. | |
| 6,021,403 A | 2/2000 | Horvitz et al. | |
| 6,055,505 A | 4/2000 | Elston | |

(Continued)

OTHER PUBLICATIONS

A. J. Bernheim Brush, et al., "Notification for shared annotation of digital documents", Apr. 2002, ACM Press, vol. 4, Issue No. 1, pp. 89-96.*

(Continued)

*Primary Examiner*—Wei Zhen
*Assistant Examiner*—Anna Deng
(74) *Attorney, Agent, or Firm*—Amin, Turocy & Calvin, LLP

(57) ABSTRACT

The present invention relates to a system and methodology to facilitate development, debug, and deployment of a notification platform application. This includes providing various editor and display tools that interact with diverse components of the application in the context of a dynamic framework and development environment adapted to the nuances of the components. Visual displays and interfaces are provided that depict the various components of an application along with the relationships between the components. Developers are then directed though the components of the application in a visual manner, wherein various editors can be invoked to design a portion of the application relating to the selected component. Other aspects include providing a debug environment for troubleshooting a notification application along with deployment options to install and execute the application.

31 Claims, 29 Drawing Sheets

U.S. PATENT DOCUMENTS

| | | | |
|---|---|---|---|
| 6,055,570 | A | 4/2000 | Nielsen |
| 6,122,633 | A | 9/2000 | Leyman et al. |
| 6,138,158 | A | 10/2000 | Boyle et al. |
| 6,151,643 | A | 11/2000 | Cheng et al. |
| 6,167,448 | A | 12/2000 | Hemphill et al. |
| 6,173,284 | B1 | 1/2001 | Brown |
| 6,185,613 | B1 | 2/2001 | Lawson et al. |
| 6,208,996 | B1 | 3/2001 | Ben-Shachar et al. |
| 6,209,011 | B1 | 3/2001 | Vong et al. |
| 6,219,782 | B1 | 4/2001 | Khan et al. |
| 6,256,664 | B1 | 7/2001 | Donoho et al. |
| 6,260,148 | B1 | 7/2001 | Aggarwal et al. |
| 6,275,957 | B1 | 8/2001 | Novik et al. |
| 6,292,825 | B1 | 9/2001 | Chang et al. |
| 6,314,533 | B1 | 11/2001 | Novik et al. |
| 6,353,926 | B1 | 3/2002 | Parthesarathy et al. |
| 6,400,810 | B1 | 6/2002 | Skladman et al. |
| 6,405,191 | B1 | 6/2002 | Bhatt et al. |
| 6,424,966 | B1 | 7/2002 | Meyerzon et al. |
| 6,438,618 | B1 | 8/2002 | Lortz et al. |
| 6,466,949 | B2 | 10/2002 | Yang et al. |
| 6,480,885 | B1 | 11/2002 | Olivier |
| 6,487,548 | B1 | 11/2002 | Leymann et al. |
| 6,510,429 | B1 | 1/2003 | Todd |
| 6,574,552 | B2 * | 6/2003 | Yano et al. ............. 701/209 |
| 6,629,138 | B1 | 9/2003 | Lambert et al. |
| 6,643,682 | B1 | 11/2003 | Todd et al. |
| 6,662,195 | B1 | 12/2003 | Langseth et al. |
| 6,704,803 | B2 * | 3/2004 | Wilson et al. ............. 719/315 |
| 6,748,318 | B1 * | 6/2004 | Jones ............. 701/201 |
| 6,751,657 | B1 | 6/2004 | Zothner |
| 6,807,482 | B2 * | 10/2004 | Utsumi ............. 701/209 |
| 6,826,560 | B1 | 11/2004 | Leymann et al. |
| 6,829,478 | B1 * | 12/2004 | Layton et al. ............. 455/428 |
| 6,829,639 | B1 | 12/2004 | Lawson et al. |
| 6,829,770 | B1 | 12/2004 | Hinson et al. |
| 6,839,730 | B1 | 1/2005 | Ramabhadran |
| 6,847,889 | B2 * | 1/2005 | Park et al. ............. 701/209 |
| 6,904,383 | B2 * | 6/2005 | Tanaka et al. ............. 702/169 |
| 6,910,033 | B2 | 6/2005 | Rosenblum |
| 6,910,070 | B1 | 6/2005 | Mishra et al. |
| 6,938,240 | B2 * | 8/2005 | Charisius et al. ............. 717/104 |
| 6,981,250 | B1 * | 12/2005 | Wiltamuth et al. ............. 717/170 |
| 6,988,262 | B1 * | 1/2006 | Mallory et al. ............. 717/127 |
| 7,032,115 | B2 * | 4/2006 | Kashani ............. 713/300 |
| 7,089,530 | B1 * | 8/2006 | Dardinski et al. ............. 717/105 |
| 7,275,235 | B2 * | 9/2007 | Molinari et al. ............. 717/100 |
| 2001/0009016 | A1 | 7/2001 | Hoffman et al. |
| 2002/0010804 | A1 | 1/2002 | Sanghvi et al. |
| 2002/0032597 | A1 | 3/2002 | Chanos |
| 2002/0032602 | A1 | 3/2002 | Lanzillo et al. |
| 2002/0032771 | A1 | 3/2002 | Gledje |
| 2002/0035482 | A1 | 3/2002 | Coble et al. |
| 2002/0069244 | A1 | 6/2002 | Blair et al. |
| 2002/0075293 | A1 * | 6/2002 | Charisius et al. ............. 345/704 |
| 2002/0077842 | A1 * | 6/2002 | Charisius et al. ............. 705/1 |
| 2002/0077910 | A1 * | 6/2002 | Shioda et al. ............. 705/14 |
| 2002/0080938 | A1 | 6/2002 | Alexander et al. |
| 2002/0082919 | A1 | 6/2002 | Landau et al. |
| 2002/0087740 | A1 | 7/2002 | Castanho et al. |
| 2002/0095399 | A1 | 7/2002 | Devine et al. |
| 2002/0115423 | A1 * | 8/2002 | Hatae et al. ............. 455/404 |
| 2002/0120711 | A1 | 8/2002 | Bantz et al. |
| 2002/0136173 | A1 | 9/2002 | Monroe et al. |
| 2002/0154010 | A1 | 10/2002 | Tu et al. |
| 2002/0165729 | A1 | 11/2002 | Kuebert et al. |
| 2002/0167488 | A1 * | 11/2002 | Hinckley et al. ............. 345/156 |
| 2002/0194305 | A1 | 12/2002 | Sadeghi et al. |
| 2003/0025599 | A1 * | 2/2003 | Monroe ............. 340/531 |
| 2003/0046539 | A1 | 3/2003 | Negawa |
| 2003/0050046 | A1 | 3/2003 | Conneely et al. |
| 2003/0069002 | A1 * | 4/2003 | Hunter et al. ............. 455/404 |
| 2003/0083952 | A1 * | 5/2003 | Simpson et al. ............. 705/26 |
| 2003/0101322 | A1 * | 5/2003 | Gardner ............. 711/163 |
| 2003/0131143 | A1 | 7/2003 | Myers |
| 2003/0154193 | A1 | 8/2003 | Rosenblum |
| 2003/0172368 | A1 * | 9/2003 | Alumbaugh et al. ............. 717/106 |
| 2003/0177402 | A1 | 9/2003 | Piazza |
| 2004/0002988 | A1 | 1/2004 | Seshadri et al. |
| 2004/0083463 | A1 * | 4/2004 | Hawley ............. 717/140 |
| 2004/0128359 | A1 | 7/2004 | Horvitz et al. |

OTHER PUBLICATIONS

Hong-Tai Chou, et al., "Versions and change notification in an object-orented database system", Jun. 1988, IEEE Computer Society Press, Paper 20.4 275-281.*

Robert E. Gruber, et al., "High-level constructs in the READY event notification system", Sep. 1998, ACM Press, p. 195-202.*

Sasu Tarkoma, "Scalable Internet Event Notification Architecture (Siena)", Spring 2002, Helsinki.

Ellen Muraskin, "Notification Engines and Apps", Oct. 5, 2001, www.convergence.com.

"Event Broker/Monitor (Bea Tuxedo System)", 1999, http://edocs.bea.com/wle/wle42/admin/events.htp.

Eric Schmidt, "Reliable XML Web Services", Dec. 11, 2001, Microsoft MSDN, 10 pages, last printed on Apr. 7, 2006.

U.S. Appl. No. 10/180,360, filed Jun. 26, 2002, Seshadri et al.

U.S. Appl. No. 10/376,197, filed Feb. 26, 2003, Seshadri et al.

U.S. Appl. No. 10/373,328, filed Feb. 24, 2003, Pather et al.

U.S. Appl. No. 10/375,628, filed Feb. 26, 2003, Pather et al.

U.S. Appl. No. 10/375,250, filed Feb. 27, 2003, Seshadri et al.

Bea Systems, "Event Subscription and Notifications", 2000, 4 pages, printed Jul. 25, 2005 from http://e-docs.bea.com/tuxedo/tux71/html/dvlibra7.htm.

Hanson, et al., "A Flexible and Recoverable Client/Server Database Event Notification System", VLDB Journal, 1998, vol. 7, pp. 12-24.

"Configurable Interface for Processing Notifications", Aug. 19, 1999, www.sba.widener.edu/saphelp, printed Mar. 6, 2003, 3 pages.

IEEE, "The Authoritative Dictionary of IEEE Standards Terms", 2000, 7th Edition, p. 701.

"Interactive Notification Server", www.brience.com, Copyright 2000-2000, printed Mar. 10, 2003, 5 pages.

Steve Trythall, "JMS and COBRA Notification Interworking", Dec. 12, 2001, www.oreilly.com, printed Mar. 25, 2003, 9 pages.

Microsoft Corporation, "Global XML Web Services Architecture", White Paper, Oct. 2001, 11 pages.

Microsoft Corporation, "An Introduction to Microsoft Transaction Server", Jan. 8, 1998, printed Oct. 21, 2005 from http://msdn.microsoft.com/archive/en-s/dnarmts/html/msdn_mtsintro.asp, 5 pages.

Vassili Bykov, "TOPlink for SmallTalk 5.0: What's new, what's old?", Smalltalk Chronicles, vol. 1, No. 2, Sep. 1999, printed Mar. 19, 2003, 9 pages.

Berndtsson, et al., "Cooperative Problem Solving: A New Direction for Active Databases", 1996, 4 pages, 2 pages of citation.

U.S. Appl. No. 10/180,662, Pather, et al.

U.S. Appl. No. 10/180,159, Seshadri et al.

Rosenblum, et al., "A Design Framework for Internet-Scale Event Observation and Notification", 1998, 17 pages.

Microsoft Corp., "Microsoft SQL Server Notification Services Technical Overview", Apr. 2002, White Paper, 23 pages.

Rob Taylor, "Transact-SQL", Dec. 20, 2000, SQL Team.com, 2 pages printed on Jan. 26, 2005 from http://www.sqlteam.com/item.asp?ItemID=1650.

Michael Kantor and David Redmiles, Creating an Infrastructure for Ubiquitous Awareness, Information and Computer Science, University of California, Irvine 92697, 2001.

Bowman, et al. "The Practical SQL Handbook: Using SQL Varients", 2001, pearson technology group, 4th Edition.

Antonio Carzaniga, Design of a Scaleable Event Notification Service: Interface and Architecture, Aug. 1998, U. of Colorado.

* cited by examiner

US 7,360,202 B1

USER INTERFACE SYSTEM AND METHODS FOR PROVIDING NOTIFICATION(S)

REFERENCE TO RELATED APPLICATION(S)

This application is a continuation in part of U.S. patent application Ser. No. 10/180,360 which was filed Jun. 26, 2002, entitled System and Method for Providing Notification(s), the entirety of which is incorporated herein by reference.

TECHNICAL FIELD

The present invention relates generally to computer systems, and more particularly to a system and method for developing applications in the context of a notification platform.

BACKGROUND OF THE INVENTION

Empowering people to make well-informed decisions has become increasingly important in today's fast-paced environment. Providing individuals with relevant and timely information is an essential element in facilitating such well-informed decisions. However, certain information that is noise to some may be very valuable to others. Additionally, some information can also be temporally critical and as such there may be significant value associated with timely delivery of such information. Moreover, some individuals prefer to stay apprised of information, even though not critical. A challenge is to provide information in a desired manner notwithstanding vast differences in individuals' information and delivery preferences.

Many conventional methods of gathering information require proactively requesting and searching for the information, often mandating sifting through dozens of messages, hundreds of articles, or referencing numbers or trends in reports. Furthermore, existing technologies assume that a person desiring such information is at a computer and has time and ability to retrieve the information. Moreover, people are increasingly mobile and cannot always be within close proximity of a computer. As a result, Internet-enabled mobile devices are becoming increasingly popular and have generated demand for services that deliver timely, personalized information regardless of location, on whatever suitable device is available and accessible.

Some have attempted to accommodate such demand by building systems that allow individuals to subscribe to an application that automatically delivers information of interest. However, most of such information delivery systems have been poorly built employing ad-hoc techniques. Additionally, conventional systems have difficulty with respect to scaling because of the complexity associated with processing meaningful queries in connection with a large number of disparate events or publications, and delivering results to subscribers given the varying types of individual delivery preferences as well as recipient device types. Consequently, conventional notification systems are inefficient, difficult to maintain and administer, unreliable, and are inadequate for hosting large-scale applications.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology for developing applications in accordance with a notification platform. An Application Definition File (ADF) describes many components that interact to perform notification services, wherein the components are often in various languages and formats. A visual user interface is provided that facilitates efficient design, debug, management and deployment of an ADF and related configuration file (and other related files) when developing notification applications by directing developers through visual diagrams and processes leading to the development and ultimately deployment of a notification application. In one aspect, an ADF Designer editor is provided to enhance the development experience relating to design of the application. By showing visual representations of notification platform components, the developer is better able understand the interactions and/or relationships between application components while mitigating the need to manually code these components in XML or other language, for example. Thus, underlying XML mechanisms can be hidden to reduce complexities of design. Similarly, the present invention supports a development environment that includes several tools that can be employed to view, navigate, and edit files in a visual manner. These tools include the ADF Designer editor, a Configuration Designer editor, a class view interface to view classes of an application and relationships to projects, project view displays along with file view aspects associated with the application. Furthermore, visual keys or cues can be provided that lead developers along the path of completing an application. For example, such keys can lead developers to visual editors or sub-editors that are driven from selected portions of an application. The editors also can be visually navigated to from different areas of the interface such as from the ADF Designer editor and the class view interface.

In another aspect of the present invention, the user interface can interact with a debugger tool that facilitates troubleshooting the application. Since notification applications include components developed in various languages (e.g., XML, SQL, C#, and so forth), the debugger tool provides an abstraction of a typical debug environment that is generally directed to a particular language. Thus, depending on the portion of the application that is being debugged, the debugger tool provides components that interact with a respective language that is associated with the application under review or troubleshooting. For example, if an SQL portion of an application is being debugged, the debugger tool enables setting breakpoints or traps in the environment of an SQL runtime environment, whereas if in the same application, a C# component is being debugged, a C# debug interface can be provided. After the application has been debugged, the present invention provides components to efficiently deploy the application and its diverse components within the framework of the notification platform.

In general, the above framework and protocols are adapted to an automated notification system that facilitates providing notification services via a notification architecture that is highly scalable (both up and down) and can process a large volume of queries with respect to a plurality of disparate service providers, event providers, subscription management components, and subscribers. One aspect of the subject invention provides for a distributed notification platform that facilitates building and maintaining reliable, high performance, and scalable applications. More particularly, the platform of the subject invention provides a manner in which to express event schema, subscription schema, notification schema, and rules in a rich manner (e.g., SQL) as well as allowing a service provider to express content formatting and protocols that can be implemented in connection with distributing notifications. The invention includes an execution engine that integrates information propagated in accordance with the aforementioned schema, formatting and protocols to provide highly scalable notification services.

Another aspect of the invention provides for abstracting subscription and subscriber information (as well as event information if desired) to high-level classes (e.g., data fields)—thus the invention provides for modeling such notification related information as data. Subscription applications can thus be developed at high levels wherein complex subscription queries and subscriber information can be defined as data fields for example. Databases in accordance with the data fields can be propagated with subscription/subscriber specific information. The present invention takes advantages of the processing power associated with database engines (e.g., SQL server) to generate notifications via performing a join operation on the databases (e.g., subscription database tables or data sets, subscriber database tables or data sets and event database tables or data sets. Accordingly, notifications are generated en masse, as compared to per subscription per subscriber which can consume significant computing resources. By modeling the notification related information (e.g., subscription queries, subscriber information, event information . . . ) as data and leveraging the power of relational database systems to perform set-oriented manipulations on this data efficiently, the present invention provides for a highly scalable and efficient notification system.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate development, management, debug, and deployment of a notification platform application. This includes providing various editor and display tools that interact with diverse components of the application in the context of a dynamic framework and development environment adapted to the nuances of the components (e.g., editor tool invoked in language of selected component, debugger tool providing debug options in various languages). Visual displays and interfaces are provided that depict the various components of an application along with the relationships between the components. Developers are then directed though the components of the application in a visual manner, wherein various editors can be invoked to design a portion of the application relating to the selected component. Other aspects include providing a debug environment for troubleshooting a notification application along with deployment options to install and execute the application.

As used in this application, the terms "component," "interface," "display object," "system," "icon," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 4:
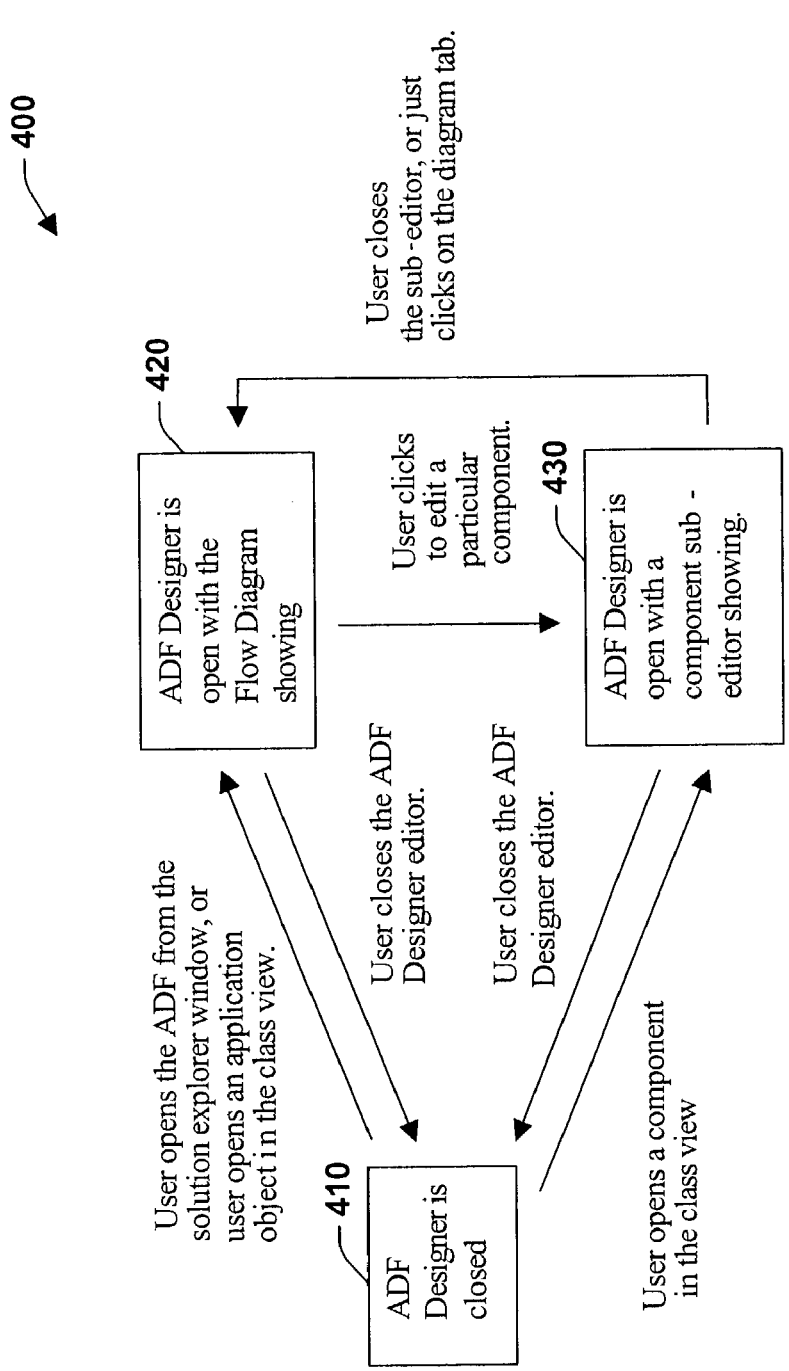
FIG. 4 is a state diagram depicting example types of screen-to-screen navigation that is available to a user in accordance with an aspect of the present invention.

Referring initially to FIG. 4, a notification system 100 for providing notifications is illustrated in accordance with an aspect of the present invention. The system 100 employs a notification platform 110 to distribute information from one or more event sources 114 that generate notifications to one or more notification sinks 120 that receive information from the sources. In order to receive information from the event sources 114, one or more subscriptions 124 are obtained to determine which of the event sources cause automated notifications to occur at the notification sinks 120. For example, a news subscription may request notifications from three different news sources such as a breaking news source, a sports source, and a business news source. If a subscriber has suitably subscribed to this type news subscription, then notifications that are generated from any of the three sources can be passed to the notification sinks 120, wherein the notification platform 110 selects when and if information from the event sources 114 is passed or routed to the sinks. In another example, information gathered from various stock sources may be passed in accordance with a financial service that delivers stock notifications to the sinks 120.

It is noted that the notification platform 110 can include various components such as an SQL server(s) that processes a plurality of event sources 114, and performs join operations to distribute notifications to the sinks 120, wherein the notification platform 110 performs various database and communications operations. The notification platform 110 can thus collect or aggregate information from one or more of the event sources 114 and distribute the collected information to the notification sinks 120. It is also noted that various systems and components can be provided to facilitate operations between the notification platform 110, event sources 114 and notification sinks 120 which are described in more detail below.

Generally, the notification platform 110 is configured to process/deliver notifications via one or more application components 128. The application components 128 include such aspects as an Application Definition File (ADF) that defines a notification application and is described in more detail below. Other application components 128 include configuration or other type files, code, and/or schemas. In order to design, manage, debug, and/or deploy the application components 128 within the notification platform 110, one or more automated tools 130 are provided in accordance with the present invention. The automated tools 130 provide various options for leading a designer through a visual process that constructs/links the various components of a notification application. As noted above, notification applications can require processing and manipulations disparate elements including various programming languages and constructs.

According to one aspect of the present invention, the tools 130 include a visual editor 140 that includes visual interfaces (e.g., Graphical User Interface (GUI)) for creating and manipulating the application components 128. This can include iconic manipulations of the application components and interface that drive sub-editing operations of selected application components. As an example, the visual editor 140 can be associated with a desktop development tool (e.g., Visual Studio) or web browser although other type applications can be utilized. The visual editor 140 includes a display having one or more display objects (not shown) including such aspects as configurable icons, buttons, sliders, input boxes, selection options, menus, tabs and so forth having multiple configurable dimensions, shapes, colors, text, data and sounds to facilitate operations with the application components 128. In addition, the visual editor 140 can also include a plurality of other inputs or controls for adjusting and configuring one or more aspects of the present invention and as will be described in more detail below. This can include receiving user commands from a mouse, keyboard, speech input, web site, remote web service and/or other device such as a camera or video input to affect or modify operations of the visual editor 140.

A views component 144 provides alternative displays and groupings of the application components 128. Such displays can include alternative paths to sub-editing operations and include such aspects as class views, project views for creating and adding to existing applications, and file views providing visual application renderings which are described in more detail below. A debug tool 150 can be employed to troubleshoot or debug one or more of the application components 128. This can include such aspects as setting breakpoints or performing instruction execution tracing during operations of the application components 128. The debug tool 150 is generally provided as a higher-level abstraction tool for one or more language-directed debuggers that debug various portions of the application components 128. For example, if an application component 128 is written in C# language, the debug tool provides C# debugging options, whereas if another type language is employed by the application components 128, then an alternative type of debugger is called by the debug tool 150. After the application components 128 have been debugged or after it is determined that notification operations are successful, a deployment tool 154 can be provided to distribute the application components within the system 100 and is described in more detail below.

In one example of the present invention, the visual editor 140 can be implemented as a desktop editor and integrated with other development applications, if desired. Various editor windows are provided that can be stretched and docked in various ways. These windows can automatically display scroll bars when information content is too large for a selected area of a display screen. Also, users have the ability to create multiple editor windows for the same application and to place them side-by-side (or other arrangement). This allows the user to view details of one part of the application (such as schemas) while editing another part of the application (such as rules).

Figure 1:
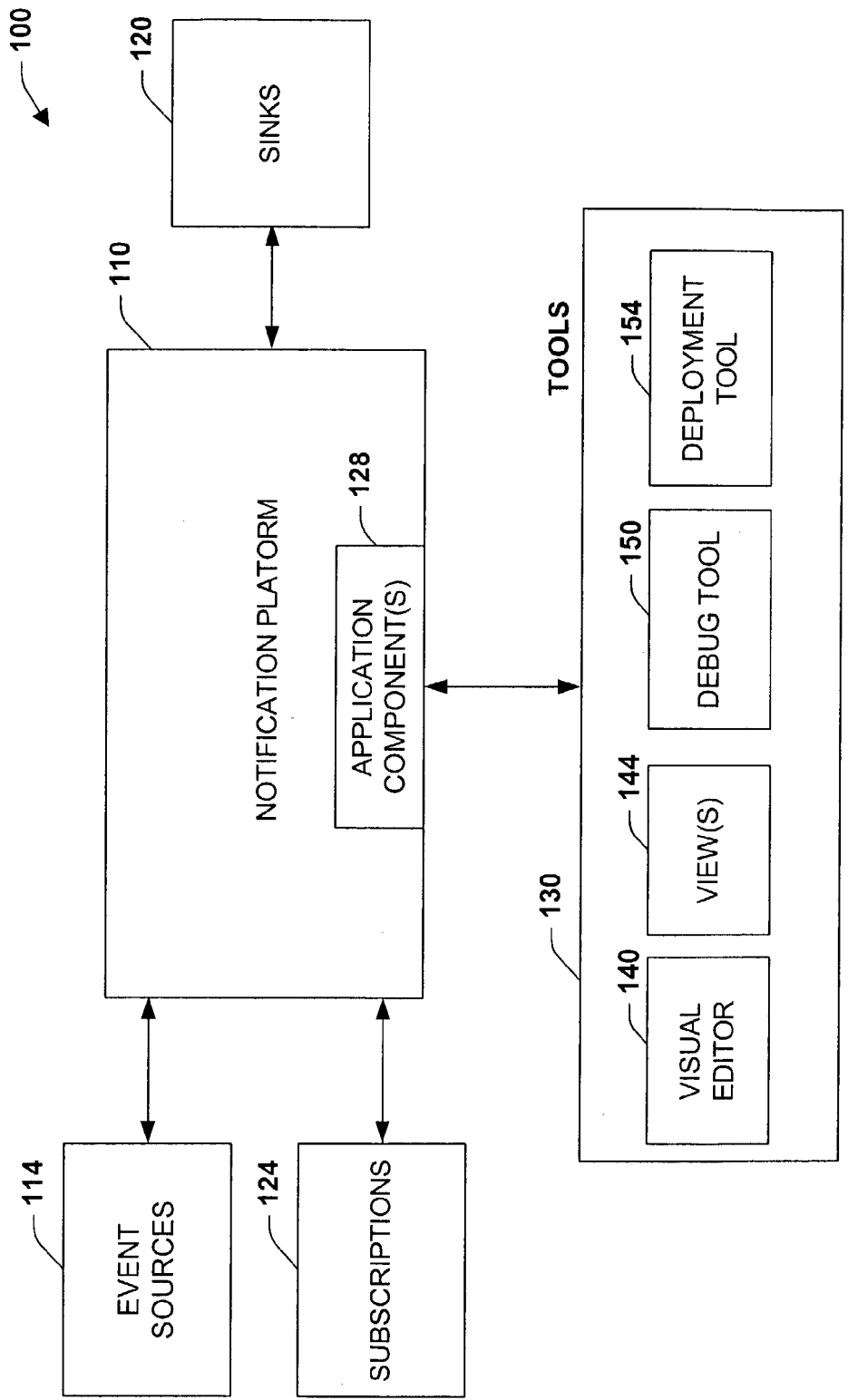
FIG. 1 is a schematic block diagram of a notification system for providing notifications and development tools in accordance with an aspect of the present invention.
Figure 2:
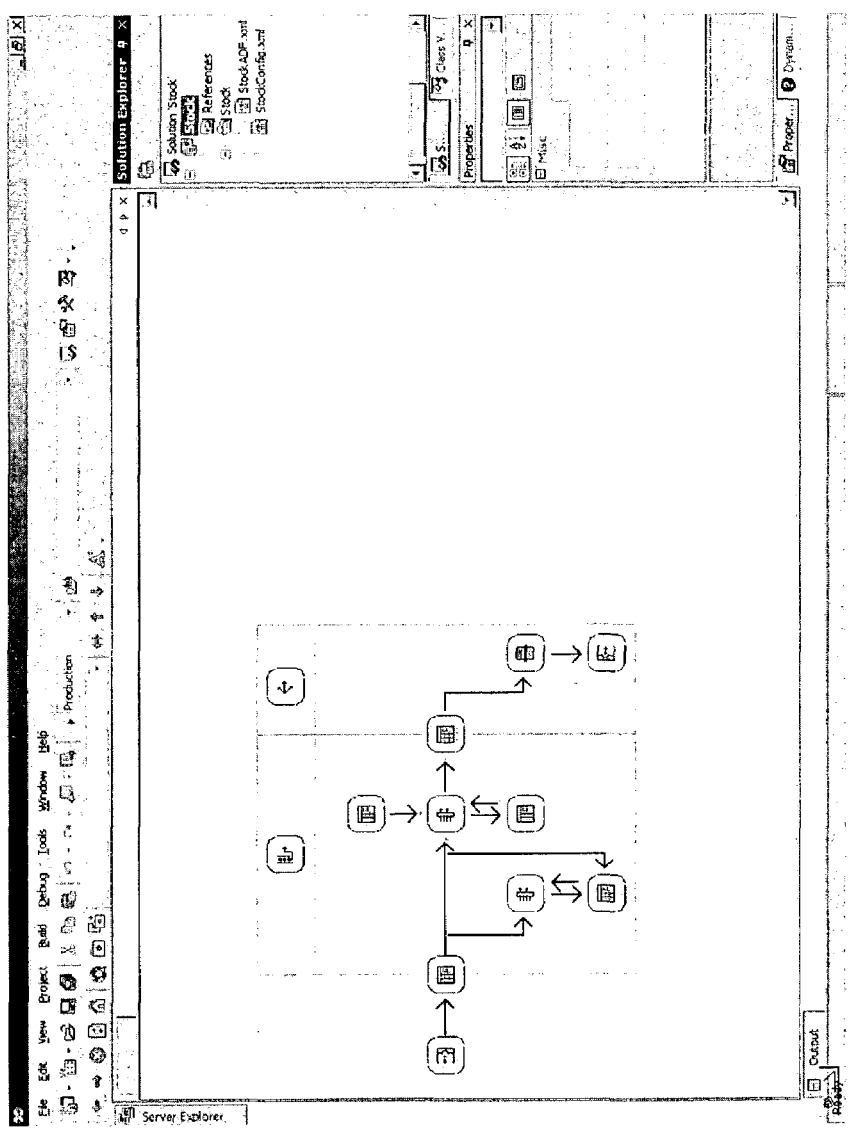
FIGS. 2 and 3 illustrate basic components of a visual editor in accordance with an aspect of the present invention.
Figure 3:
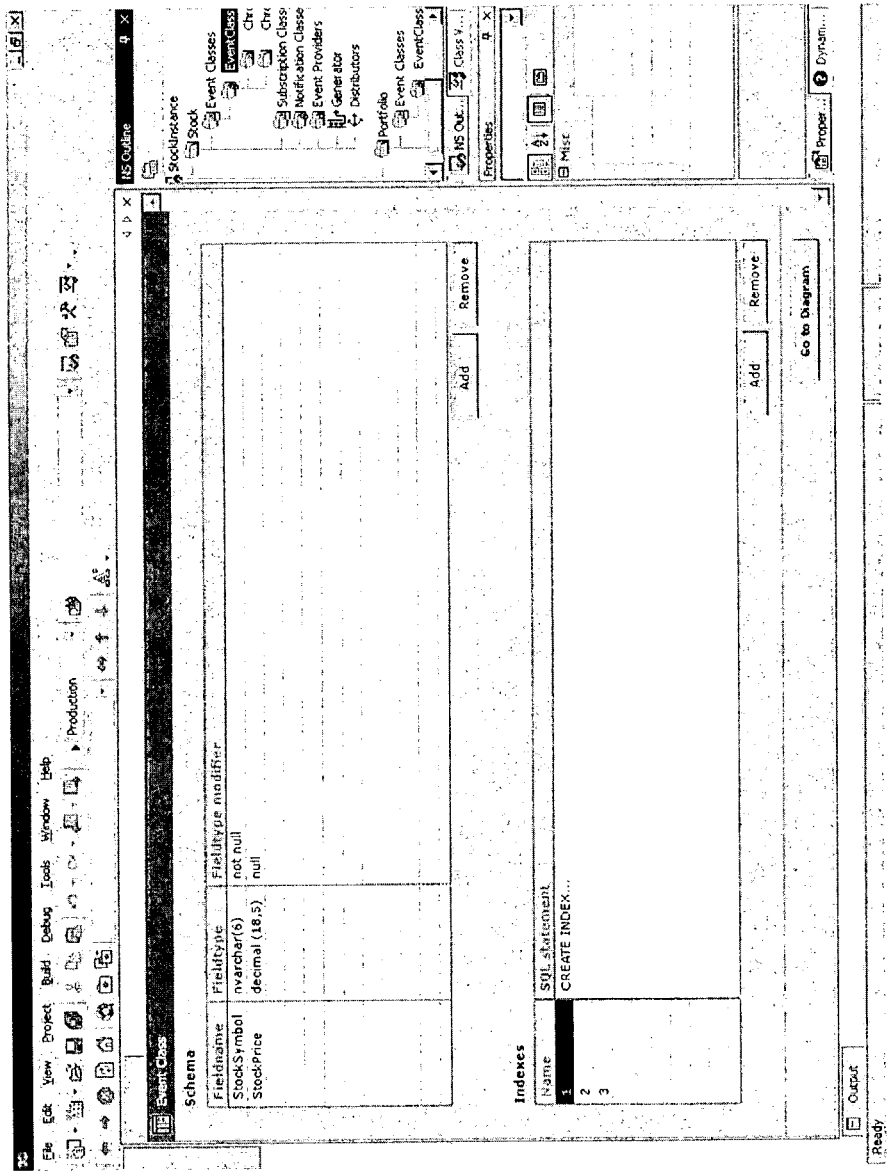

Referring now to FIGS. 2 and 3, basic example components of a visual editor are illustrated in accordance with the present invention. It is noted that as used herein, the visual editor can also be referred to as an ADF Designer, however, as noted above, other type applications can also be developed in accordance with the present invention. It is also noted that nodes generally represent components of the application, and arrows between them represent relationships such as data-flow. However, while each node may represent a set of identical items, it is to be appreciated that nodes can represent a single item. Moreover, the exact look of the nodes and arrows can be provided in a variety of different formats and designs. Typically, an ADF Designer has two primary components:

1. A Flow Diagram

This is a graphical surface in which nodes and arrows are employed to represent the data flow and general organization of an application.

2. Component Sub-Editors

This is a set of dialog-like pages, each of which is used to edit a specific component such as an Event Class or a Distributor.

FIG. 2 illustrates an ADF designer interface 200 having a flow diagram view, wherein various application components are iconized and interconnected via arrows. FIG. 3 illustrates an ADF designer 300 with an example component sub-editor view (e.g., for a subscription class). Generally, at a given instant, the ADF Designer will provide either the flow diagram view or one or more of the component sub-editors.

FIG. 4 is a state diagram 400 depicting example types of screen-to-screen navigation that is available to a user. The diagram 400 depicts data flow through a system. At reference numeral 410, one state depicted is the ADF designer being closed or unused. From this state, the ADF designer can be opened in a flow diagram view at 420 or from a component sub-editor view at 430 (e.g., opened via mouse-click selection). In addition, the sub-editor view 430 can be initiated from the flow diagram at 420 from visual cues provided within various displays described below (e.g., icon selections, buttons, graphical selections). In another aspect, class views that are described in more detail below can also open the sub-editor view at 430.

Figure 5:
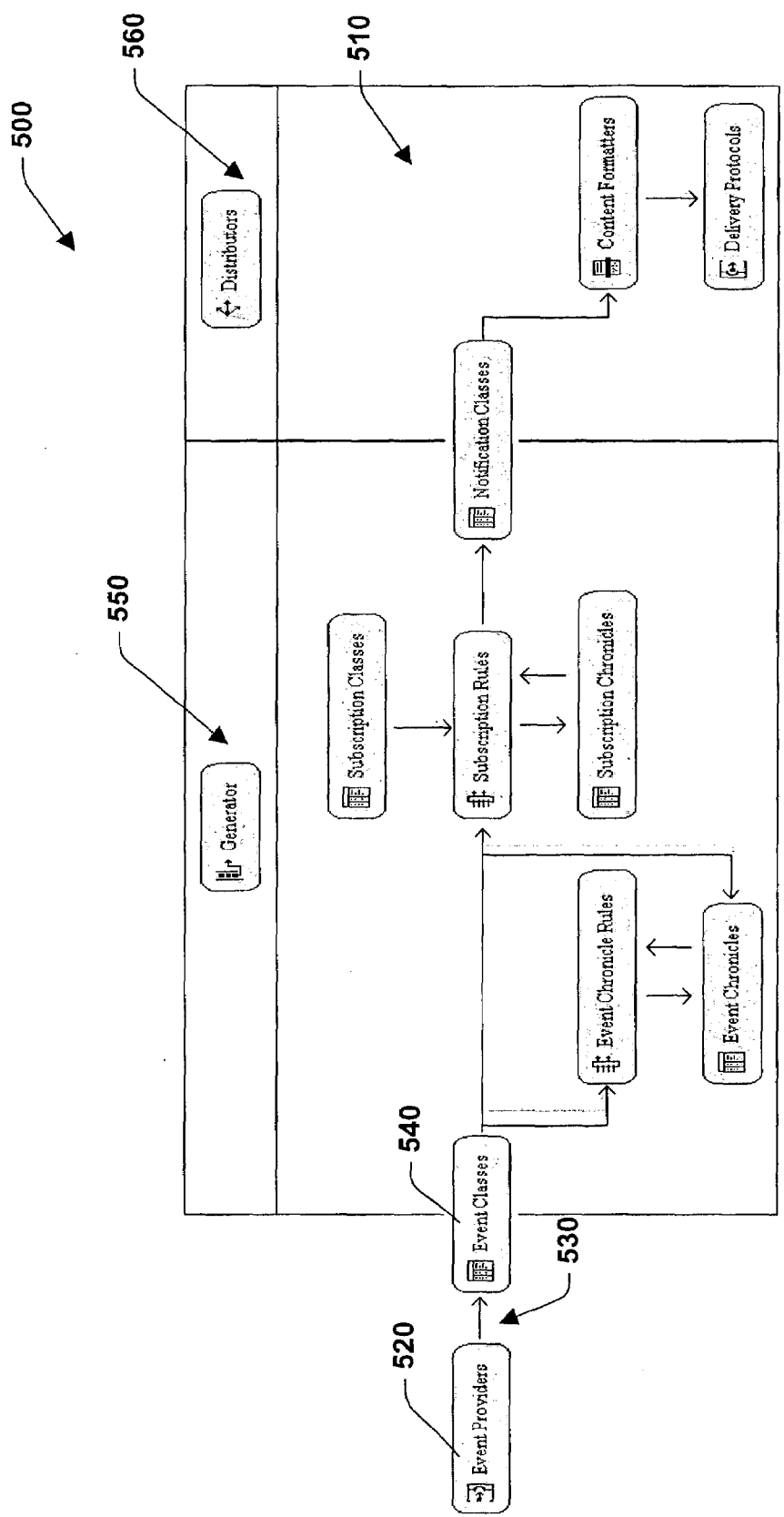
FIG. 5 illustrates basic components of an notification application in accordance with an aspect of the present invention.

FIG. 5 illustrates basic components of a notification application depicted within an ADF Designer 500 in accordance with an aspect of the present invention. The ADF Designer 500 typically has four main components although more or less components may be employed. At 510, a background is provided, wherein a white background or other color corresponds to the application itself. Various nodes can be placed within the background 510. For example, the nodes represent the basic building blocks of a Notification Services application. Respective nodes may represent more than one instance. For example, an Event Providers node 520 represents all the event providers in the ADF. Arrows show general data-flow relationships. For example, an arrow 530 between the Event Providers node 520 and an Event Classes node 540 represents, in general, information flows from an event provider into an event class. If desired, black outlines can be provided to show regions of processing. A first block 550 includes work that is done by a generator of notifications. A second block 560 includes work that is done by distributors of notifications. The following provides more detail on these basic components.

As noted above, the background 510 corresponds to the application. This can be viewed as a "plate metaphor"—the application is a plate and the items on it are food. Clicking on the background is equivalent to selecting an application object. This will cause the application properties to show up in a properties window if the properties window is open. Some application properties are:

Parameter Defaults
Version
History
Database
Application Execution Settings

The Background also provides a context menu with the following commands: These commands are also available in all the context menus for respective nodes:

Properties

This command causes a Properties window to surface, if it is not already surfaced. It also brings up the properties for the item clicked. The focus stays in the window that was right-clicked.

Commands Used for Source Control

These three commands are covered in the class view described below. The behavior here will be the same. Essentially, these commands perform operations on the ADF that contains the items.

Check Out . . .
Get Latest Version
Compare Versions . . .

Double-clicking on the background is equivalent to selecting the Properties context menu command.

The nodes in the diagram 500 represent the top-level building blocks of a Notification Services application.

Some example nodes include the following nodes:

"Event Providers" node

Generally, hosted event providers and non-hosted event providers are represented by the same node. There typically is no visual distinction.

"Event Classes" node
"Event Chronicle Rules" node
"Event Chronicles" node
"Subscription Classes" node
"Subscription Rules" node Generally, triggered subscription rules and scheduled subscription rules are represented by the same node. There is typically no visual distinction.

"Subscription Chronicles" node
"Notification Classes" node
"Content Formatters" node
"Delivery Protocols" node
"Generator" node
"Distributors" node Example icons employed in the nodes are described by the following table:

| Icon | Used by | Reasoning for design/Icon represents |
|---|---|---|
|  | Generator | Items being created processed in a queue fashion |
|  | Event Chronicle Rule Subscription Rule | A matching process. A filter - certain information enters, some leaves. |
|  | Event Provider | Information entering the system. |
|  | Distributor | Data being distributed, sent out, spread. |
|  | Delivery Protocol | Exit point for data. |
|  | Content Formatter | Data being processed to look different. |
|  | Event Class Event Chronicle Subscription Class Subscription Chronicle Notification Class | Represents a table with fields (columns) and rows. |

Figure 6:
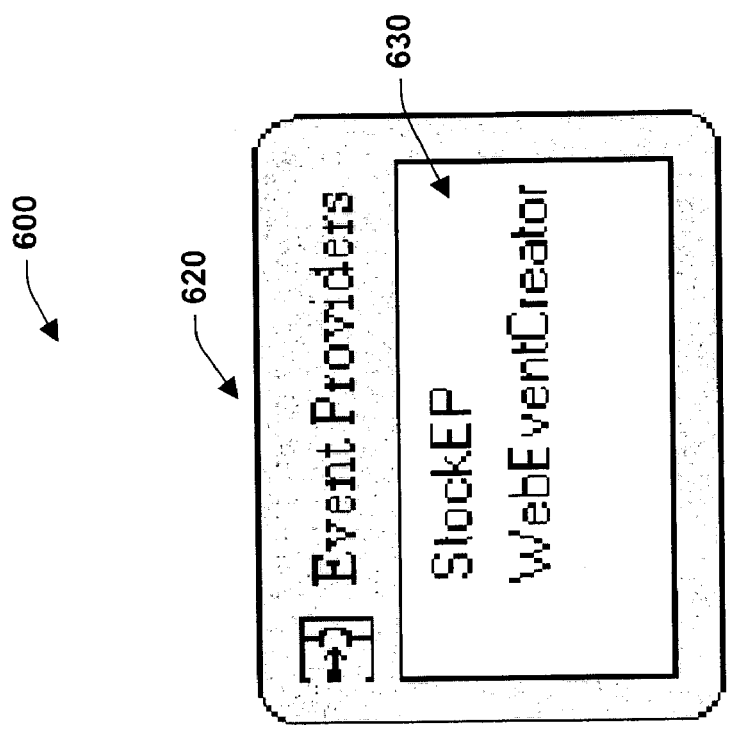
FIG. 6 illustrates alternative node displays in accordance with an aspect of the present invention.
Figure 6:
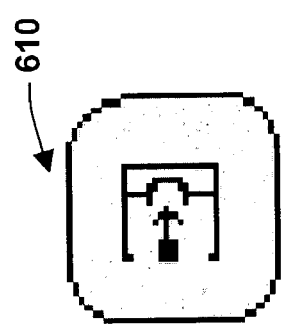

FIG. 6 illustrates alternative node displays 600 in accordance with an aspect of the present invention. Generally, nodes can be displayed in one of two states:

At 610, a Collapsed node state is illustrated. This view reduces the amount of screen space used for a node so as to make room for other nodes to be expanded. At 620, an Expanded node is illustrated. This view shows an icon, label, and a list of instances. An expanded node 620 can be used to select a specific instance for editing. It can also be used to show relationships. Typically, an instance list 630 is tall enough to list up to three items. If there are more than three items, vertical scroll bars will automatically appear. The list 630 can be as wide as the icon and label, plus a little margin. In certain cases the instance names may be too wide to show within a given box. In those cases ellipsis can be used at the right hand side. Also, tool-tips can be employed to give the full instance name.

The following table describes an example naming convention for instances listed when each node is expanded. In this table, items in brackets (such as <EventClassName>) indicate that the property with that name is used.

| Item | Naming convention for instances |
| --- | --- |
| Event provider | <ProviderName> |
| Event class | <EventClassName> |
| Event chronicle rule | <RuleName> |
| Event chronicle | <EventClassName>.<ChronicleName> |
| Subscription class | <SubscriptionClassName> |
| Subscription rule | <RuleName> |
| Subscription chronicle | <SubscriptionClassName>.<ChronicleName> |
| Notification class | <NotificationClassName> |
| Content formatter | <NotificationClassName>.<[formatter]ClassName> |
| Delivery protocol | <NotificationClassName>.<ProtocolName> |
| Generator | <SystemName> |
| Distributor | <SystemName> |

Icon layouts can be provided such that each node is placed a fixed distance away from its neighbors. This indicates that when nodes on the left of a display are collapsed to icon size, the nodes on the right shift to the left to take up the vacated space. Conversely, when nodes on the left are expanded, the nodes on the right shift further to the right to make room.

Typically, each node has two (or more) distinct mouse-sensitive areas. An area outside the instances list 630 includes the icon, the label, and a shaded background. When a node is collapsed to an icon, this is typically the mouse-sensitive region that is visible. The area inside the instances list 630 is generally visible when the node is expanded. Nodes can be selected with a single left-click on the outside region. However, nodes may not have properties associated with them. In these case, selecting a node will cause the property window to clear the properties that are currently shown in it. When a node is in the icon state 610, double clicking it has the same effect as the Expand context menu command described below. When the node is expanded, double clicking it has the same effect as the collapse command described below.

The outside region (outside of list region 630) is associated with a context menu having commands such as:

Expand/Collapse

When the node is an icon, this command is called "Expand" and it is used to open up the node. When the node is expanded, this command is called "Collapse" and it is used to shrink the node to an icon. If a node A is expanded, and there is another node B which is already expanded, and if node B is not a member of a focus group, then node B is automatically collapsed. Focus groups are discussed further below.

Add>

This command allows user's to add a new instance to the node's list of instances. This command actually leads to a sub-context menu that is slightly different from one node to another. The following table lists the commands in each node's Add sub-menu.

| Node | Add Menu Command(s) |
| --- | --- |
| Event Provider | New File System Watcher Event Provider |
| | New SQL Server Event Provider |
| | New Custom Hosted Event Provider |
| | New Custom Non-Hosted Event Provider |
| Event Class | New Event Class |
| Event Chronicle Rule | New Event Chronicle Rule |
| Event Chronicle | New Event Chronicle |
| Subscription Class | New Subscription Class |
| Subscription Rule | New Subscription Rule |
| Subscription Chronicle | New Subscription Chronicle |
| Notification Class | New Notification Class |
| Content Formatter | New XSLT Content Formatter |
| | New Custom Content Formatter |
| Delivery Protocol | New File Delivery Protocol |
| | New SMTP Delivery Protocol |
| | New Custom Delivery Protocol |
| Generator | |
| Distributor | New Distributor |

A standard action for each of these commands is that a new instance is created in the node's instances list with a default name such as EventClass{#}. The default name is highlighted so that the user can rename the instance "in-place", much like the way files are renamed in Windows file explorer, for example. As soon as the instance is named, the sub-editor for that new item is brought up. Sub-editors are discussed below.

As noted above, the inside region 630 provides a list of instances. Users can click any of these instances to select it (using a single left mouse button click). When an item is selected, its properties can be displayed in a property window. Generally, one (or more) item can be selected on the diagram 620 at a time, so selecting an item causes the previously selected item on the diagram to be deselected, even if that previously selected item is in another node's list. It is noted that if more than one item is selected, then, under some circumstances will selecting an item cause the previously selected item to become deselected. Any instance can be double clicked to bring up the sub-editor for that instance. Not all instances have an associated sub-editor. Specifically, generator and distributor instances, and non-hosted event providers do not have an associated sub-editor. In these cases, double clicking on the item doesn't have any effect.

Furthermore, users can right-click on instances in the list 630 to get a context menu with the commands described below. If users click in the list box but not on any particular instance, then the context menu is disabled.

{Show | Edit | Hide} Relationships

This command is used to bring a particular instance into focus on the diagram and to show related instances in the nodes around it.

Edit

This command loads the appropriate sub-editor for the instance that was right-clicked.

Edit in XML

This command causes an XML editor to be loaded in a separate editor window (another tab) and puts the cursor in a suitable position to edit the item that was right-clicked.

Rename

This command allows user's to rename the instance in-place, in a similar manner that file names are modified in Windows file explorer.

Remove

This command removes the item that was right-clicked from the node. This command is disabled if executing delete would cause the application to become invalid. For example, the ADF is associated with a single generator to be considered valid, thus users cannot delete it.

There are typically two context menu commands that appear in certain cases. In a context menu for a File System Watcher Event Provider there is an additional context menu command called Create Events Schema File. Clicking on this command causes a dialog to come up. In this dialog, the user selects the path to the events schema file (new or override). They can also check a box asking the project to keep an XSD file in sync with any changes to the event class schema. After clicking OK, the XSD file is created based on the event class schema defined, and its path is written into the appropriate argument, and the file is added to the project. In the context menu for an XSLT Content Formatter, there is an additional command called Create XSLT File. Clicking on this command causes a dialog to come up. In this dialog the user specifies a base directory path for XSLT's as well as the filename. They can also select a language and/or device type for the XSLT, which will cause the appropriate sub-directories to be appended to the path. After clicking OK, the XSLT file is generated based on the notification class schema. This is a "noop" XSLT, but it's setup to accept the appropriate notification class values.

The following describes details of a {Show | Edit | Hide} Relationships command, wherein the name and the effect of this command varies by situation. If the instance that was right-clicked is not currently in focus and it is not a rule, then this command is called "Show Relationships" and it is used to show relationships. It is noted that an item in focus can also be an item who's relationships are shown on the diagram. It is possible for the item with relationship-focus to be different from the item with selection-focus. If the item that was right-clicked is not currently in focus and it is a rule, then this command is called "Edit Relationships" and it is used to show relationships and to allow the relationships to be edited. This applies to event chronicle rules and to subscription rules. If the item that was right-clicked is the item in focus then this command is called "Hide Relationships" and it is used to remove UI elements that show relationships and allow them to be edited.

The Show Relationships and Edit Relationships commands have the following effects. The instance that was right-clicked gets an indicator placed next to it that indicates that it is the instance in focus. For example, this indicator can be a magnifying glass icon. The node that contains this instance is shaded to indicate that it is the node in focus. All directly related nodes are expanded if they are not already expanded. The focus node and all directly-related nodes are collectively known as the focus group. All directly related nodes are shaded in another color to indicate that they are the directly related nodes. Within each directly related node, instances that are related to the instance in focus are highlighted in some manner.

The Edit Relationships command has one additional effect. Instances in directly related nodes have checkboxes next to them that can be checked and unchecked. A checked box indicates that the instance is related. An unchecked instance indicates that the instance is not related. The status of these checkboxes is recorded in new Rule Relationship tags in the ADF.

The Hide Relationships command has the following effects. The focus indicator is removed from the instance that was right-clicked. The node that contains this instance is shaded in light green (or another color) to indicate that it is no longer in focus. All directly related nodes are shaded to indicate that they are no longer showing relationship information. All directly related nodes are collapsed to icon size so as to remove clutter. The following table lists direct relationships. These are the relationships that are highlighted on a screen when a user selects the Show Relationships or Edit Relationships command. In the table below, for each item in the left column, a list of the items that are considered directly related is provided along with a short description of the relationship. This table mentions rule relationship tags several times. These tags are described further below.

| Item | Directly Related Items | Relationship |
|---|---|---|
| Event Provider | Event Class | Event class is supplied events by this event provider. We can only determine this for known hosted providers. For the rest we can't show the relationship. |
| Event Class | Event Provider | Event provider supplies events into the event class. We can only determine this for known hosted providers. |
| | Event Chronicle Rule | Event chronicle rule has relationship tag that mentions the event class. |
| | Subscription Rule | Subscription rule has relationship tag that mentions the event class. |
| Event Chronicle Rule | Event Class | Event class is mentioned in the rule's relationship tags. |
| | Event Chronicle | Event chronicle is mentioned in the rule's relationship tags. |
| Event Chronicle | Event Chronicle Rule | The rule's relationship tags mention the event chronicle. |
| | Subscription Rule | The rule's relationship tags mention the event chronicle. |
| Subscription Rule | Event Class | The event class is mentioned in the rule relationship tags. |
| | Event Chronicle | The event chronicle is mentioned in the rule relationship tags. |
| | Subscription Class | The subscription class is mentioned in the rule relationship tags. |
| | Subscription Chronicle | The subscription chronicle is mentioned in the rule relationship tags. |
| | Notification Class | The notification class is mentioned in the rule relationship tags. |
| Subscription Class | Subscription Rule | The subscription rule's relationship tags mention the subscription class. |
| Subscription Chronicle | Subscription Rule | The subscription rule's relationship tags mention the subscription chronicle. |
| Notification Class | Subscription Rule | The subscription rule's relationship tags mention the notification class. |
| | Content Formatter | The content formatter is contained within the notification class. |
| | Delivery Protocol | The delivery protocol is contained within the notification class. |

| Item | Directly Related Items | Relationship |
|---|---|---|
| Content Formatter | Notification Class | The notification class owns the content formatter. |
| | Delivery Protocol | The delivery protocol belongs to the same notification class as this content formatter. |
| Delivery Protocol | Content Formatter | The content formatter belongs to the same notification class as this delivery protocol. |
| | Notification Class | The notification class contains this delivery protocol. |
| Generator | none | |
| Distributor | none | |

The arrows illustrated in FIG. 5 represent general data flow relationships between nodes. The butt of an arrow represents a data source and the head of an arrow represents data destination. In general, there is a fixed set of arrows on a diagram or display. In other words, the arrows typically remain the same regardless of the ADF that is being represented in the diagram. These arrows do not represent actual relationships in the user's ADF. Instead, they represent the potential relationships that the developer should consider. It is to be appreciated that if a developer defines different relationships, then the present invention can process and display such relationships.

The table below lists the fixed arrow relationships in a diagram or display such as depicted in FIG. 5.

| | From | To | Reasoning for including this arrow |
|---|---|---|---|
| 1 | Event Provider | Event Class | Event Provider puts data into an event class. |
| 2 | Event Class | Event Chronicle Rule | Event chronicle rule often uses an event class as a source of data. |
| 3 | Event Chronicle Rule | Event Chronicle | Event chronicle rule generally puts data into an event chronicle. |
| 4 | Event Chronicle | Event Chronicle Rule | The event chronicle rule may use existing event chronicle data as source information. |
| 5 | Event Class | Subscription Rule | The subscription rule often uses an event class as a source of information. The arrow can also be viewed as a triggering event class for an event-triggered subscription rule. |
| 6 | Event Chronicle | Subscription Rule | Subscription rules (especially scheduled rules) sometimes use event chronicles as a source of data. |
| 7 | Subscription Rule | Event Chronicle | Subscription rules sometimes update information in an event chronicle table. |
| 8 | Subscription Class | Subscription Rule | The subscription rule generally uses data from its parent subscription class as a source. |
| 9 | Subscription Rule | Subscription Chronicle | When a subscription chronicle is used, it's the subscription rule that updates information in the chronicle. |
| 10 | Subscription Chronicle | Subscription Rule | When a subscription chronicle is used, the rule generally uses it as a data source. |
| 11 | Subscription Rule | Notification Class | A subscription rule places information into a notification class. |
| 12 | Notification Class | Content Formatter | The content formatter pulls rows out of the notification class. |
| 13 | Content Formatter | Delivery Protocol | The delivery protocol processes messages after they are done being formatted. |

Referring now to FIGS. 7-13, various example sub-editors are illustrated in accordance with an aspect of the present invention. When a user chooses to edit a component such as an event class or a formatter, the editing environment will bring up a sub-editor for that purpose. Sub-editors are useful for a notification application since some properties may be difficult to edit in a property window, for example. Generally, there are two types of properties that require sub-editors:

1. Properties with values that are very long strings. For example: SQL of rules and indexes. It's difficult to edit such properties in a property window because it tends to be narrow.
2. Properties that are a collection of items that can grow or shrink in size. For example: content formatter arguments. It's difficult to edit such properties in the property window because there is generally not a direct way to add and remove items. The property window is well suited for editing a fixed set of properties.

The table below lists some example sub-editors:

| Sub-editor | Description |
|---|---|
| Event Class | This sub-editor has:<br>1. A grid that allows users to add, remove, and define schema fields (name, type, modifier).<br>2. A control that allows users to add, edit, and remove SQL statements that make up the index. |
| Subscription Class | Similar to the Event Class sub-editor |
| Notification Class | This sub-editor has a schema editor. It's similar to the schema editor used by event class and subscription class, but in this schema editor each field can be defined as a type or an SQL expression. |
| Event Chronicle | This sub-editor has a control that is similar to the index control in event class. It allows users to add, edit, and remove SQL statements that make up the chronicle. |
| Subscription Chronicle | Similar to the event chronicle sub-editor. |
| Subscription Rule | A box in which users can edit SQL (or other language). Skeleton code is provided based on rule relationships. |
| Event Chronicle Rule | Similar to the Subscription Rule sub-editor. |
| Event provider | A grid in which users can add, edit, and remove arguments. Arguments are name-value pairs. |
| Content formatter | Similar to the event provider |
| Delivery protocol | Similar to the grid used by the event provider sub-editor and the content formatter sub-editor, except that fields can be given a hard coded value or an SQL expression. |

Before discussing specific sub-editors, the following describes features that are common to component sub-editors:

Sub-editors load in a new editor window. Users generally need to save the work performed by clicking ctrl-S (or other function/code).

Sub-editors have a title bar at the top that identifies the kind of sub-editor. This title bar uses the same icons and names used on the nodes.

Sub-editors have dialog-like controls in the middle that are used to edit pieces of the component, such as the schema or the index. This portion varies from one sub-editor to another. When more than one control is necessary, the controls can be placed on top of one another.

In grid controls, tool-tips can be employed to explain the meaning of columns.

In these editors, the text that is typed into fields is automatically converted to conform with XML syntax (or other type depending on application). For example, > becomes >

Figure 7:
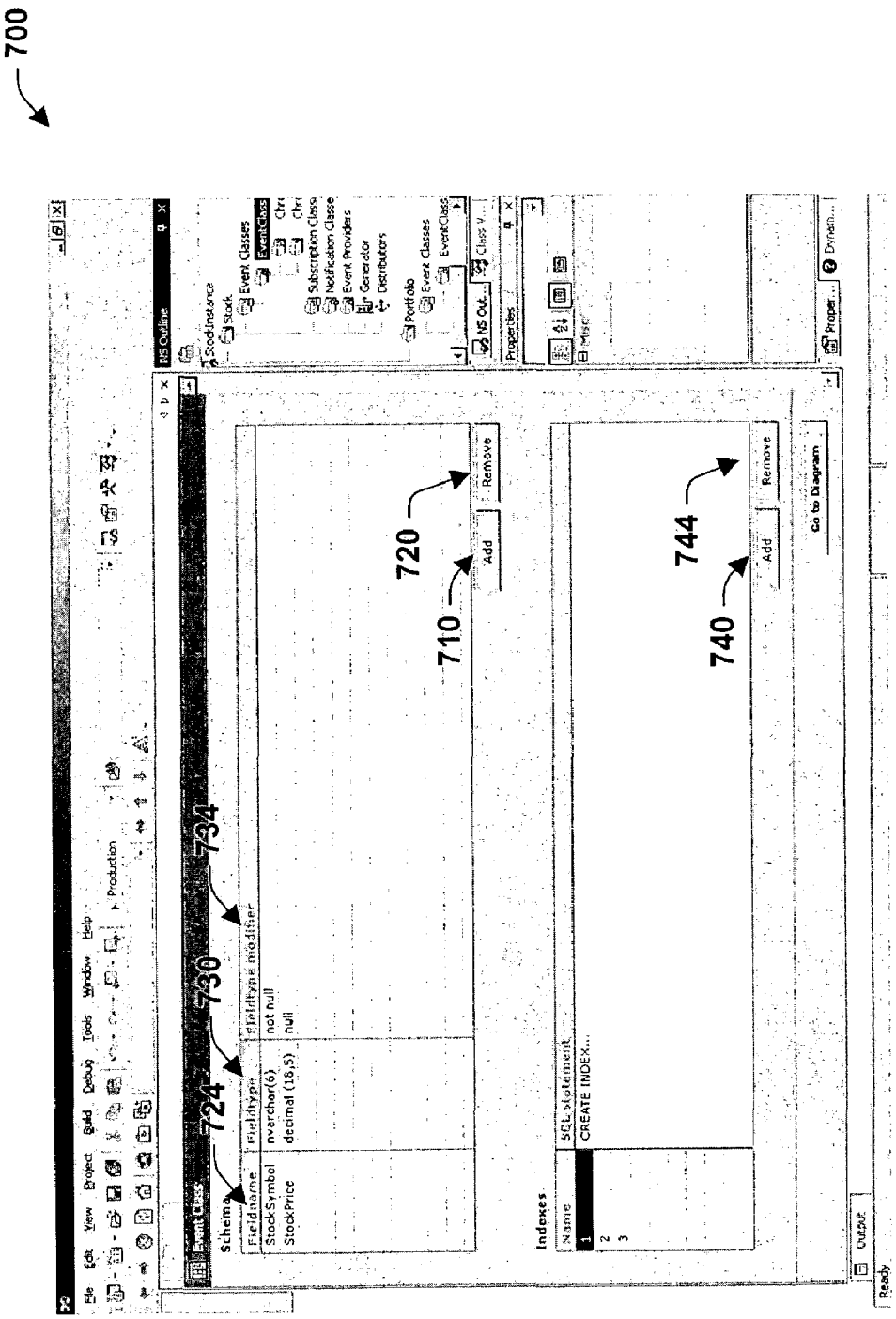
FIGS. 7-13 illustrate various example sub-editors in accordance with an aspect of the present invention.

FIG. 7 illustrates an event-class sub-editor 700 in accordance with an aspect of the present invention. A schema control allows user to specify the schema of the event class.

An Add button 710 causes a new row with default values to be added after the last used row.

A Remove button 720 causes the currently selected row to be removed. A row is considered selected if any of its cells have focus. This button is disabled when no row is selected. If the row that is removed is not the last row, succeeding rows are pulled up by one.

A Field Name column 724 allows users to type a legal field name, with limitations on string length.

A Field Type column 730 allows users to select all legal field types from a pull-down list.

A Field Type Modifier column 734 allows users to type modifiers such as "not null". The Field Type Modifier column also uses a pull-down list that offers some common modifiers such as NULL, NOT NULL, DEFAULT, and so forth. Like the Filed type column 730, users can also type directly into the box.

An index control allows users to specify an index on the event class. Each index is composed of one or more SQL statements.

An Add button 740 causes a new SQL statement to be added to the index. A new SQL statement gets the next available name (4, 5, 6 . . . ) and some default text ("--type your SQL statement here").

A Remove button 744 causes the currently selected SQL statement to be removed. An SQL statement is considered selected when it is displayed within the right-hand block. If the SQL statement removed is not the last one, all succeeding statements can be bumped up one spot and renumbered.

Left clicking on an item in the left column causes the text of that SQL statement to be displayed in the right-hand block. The SQL statement can then be edited.

It is noted that a Subscription Class Sub-Editor is similar to the event-class sub-editor, with the exception that the title says "Subscription Class" instead of "Event Class."

Figure 8:
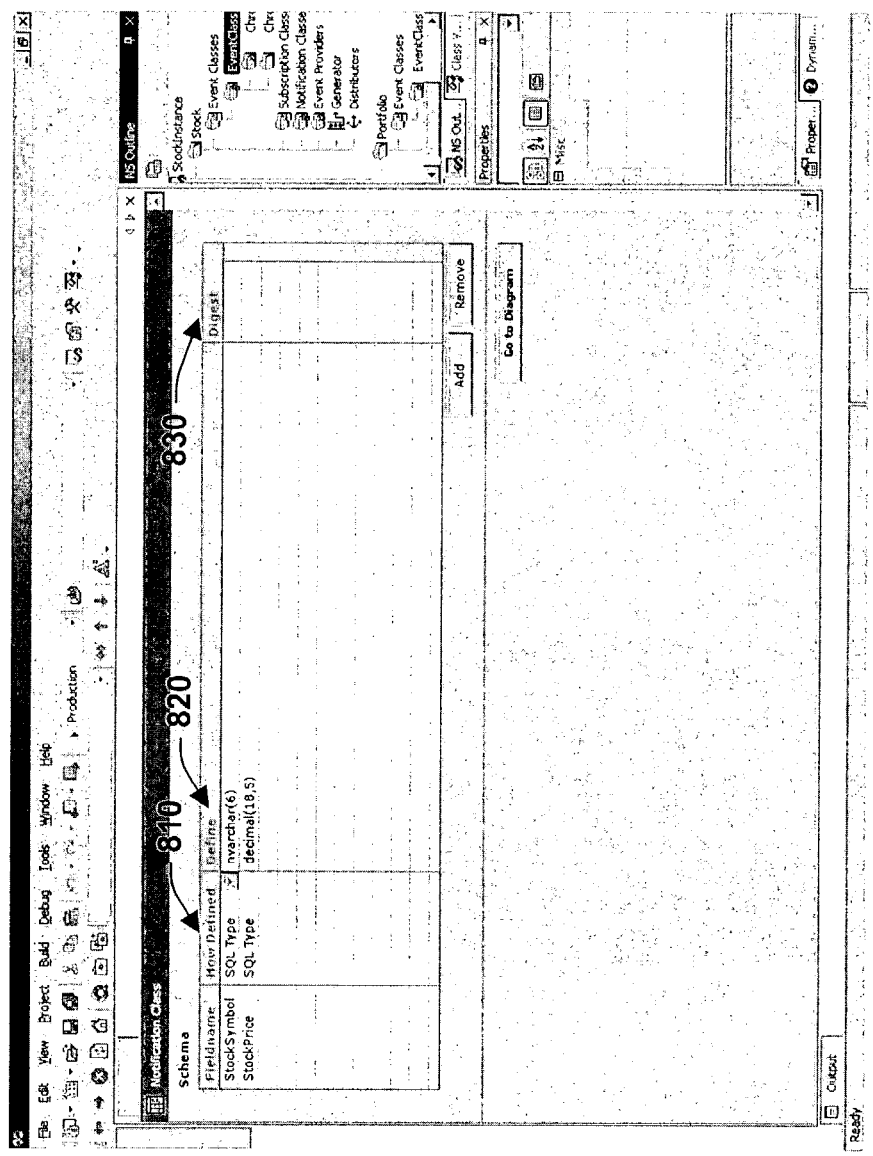

FIG. 8 illustrates a Notification Class sub-editor 800 that is used to edit the schema of a Notification Class. Note that this control is different from the one used to edit event and subscription schemas in the following ways:

Instead of a field type column, a pair of columns: How Defined 810 and Define 820. The How Defined column 810 has a pull-down list that allows users to specify "Type" or "SqlExpression." If users select "Type" then they need to enter a field type in the Define column 820. Otherwise, users can enter an SQL expression in the Define column 820.

A Digest column 830 is provided in which users can specify a value of true or false.

Figure 9:
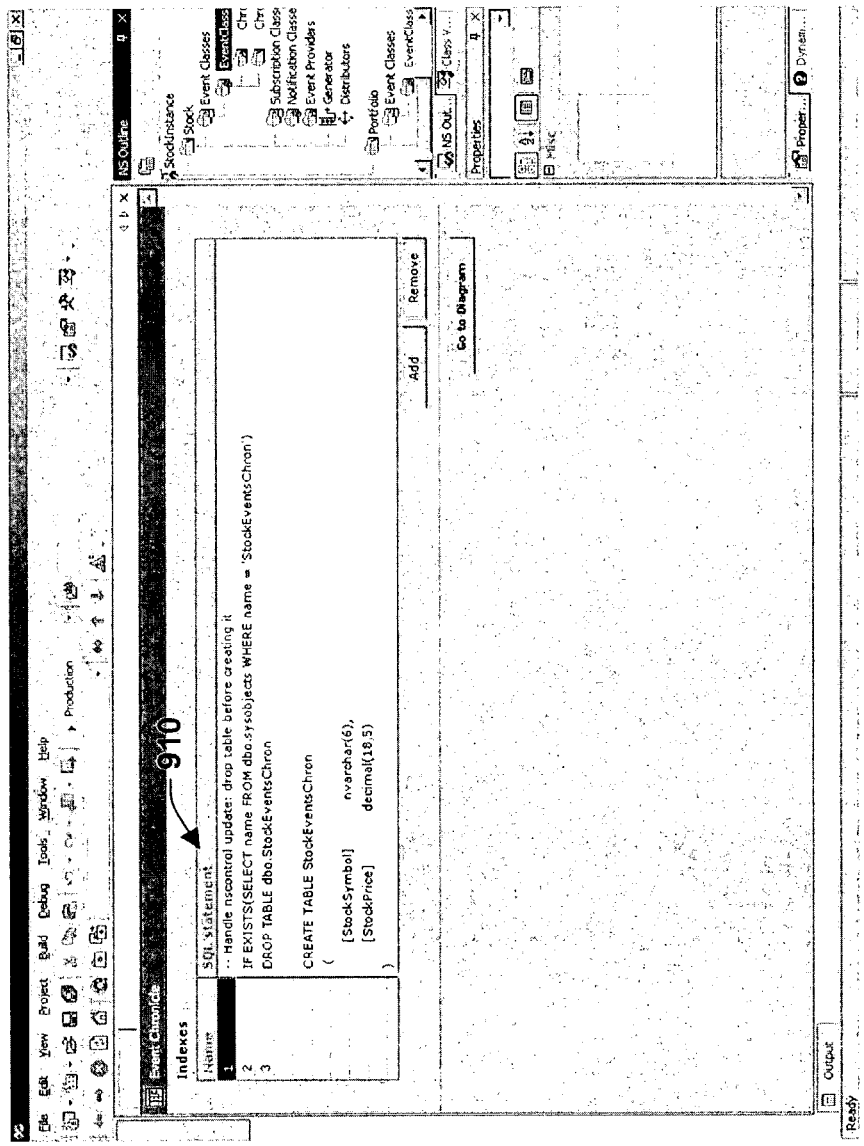

FIG. 9 illustrates an Event Chronicle Sub-Editor 900. This control is similar to the one utilized to edit an event class index. The intent is that SQL statements should be "CREATE INDEX . . . " statements illustrated at 910. A similar Subscription Chronicle Sub-Editor (not shown) can also be provided to edit subscription chronicles.

Figure 10:
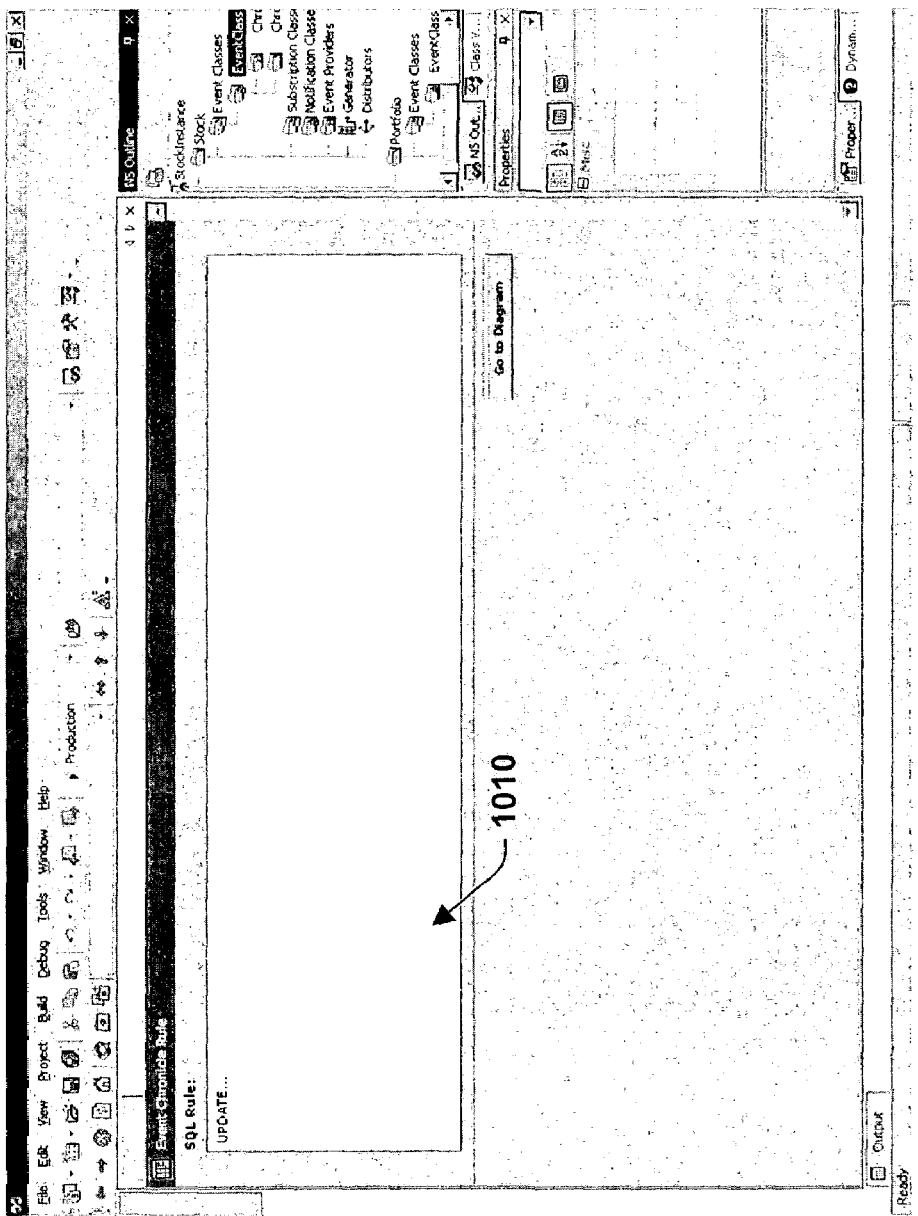

FIG. 10 illustrates an Event Chronicle Rule Sub-Editor 1000, wherein a text box 1010 can be employed by developers to edit an event chronicle rule. A Subscription Rule Sub-Editor can also be provided (not shown) that is similar to the event chronicle rules editor. Note that the subscription rule sub-editor can be used for event-triggered subscriptions and for scheduled subscriptions.

Figure 11:
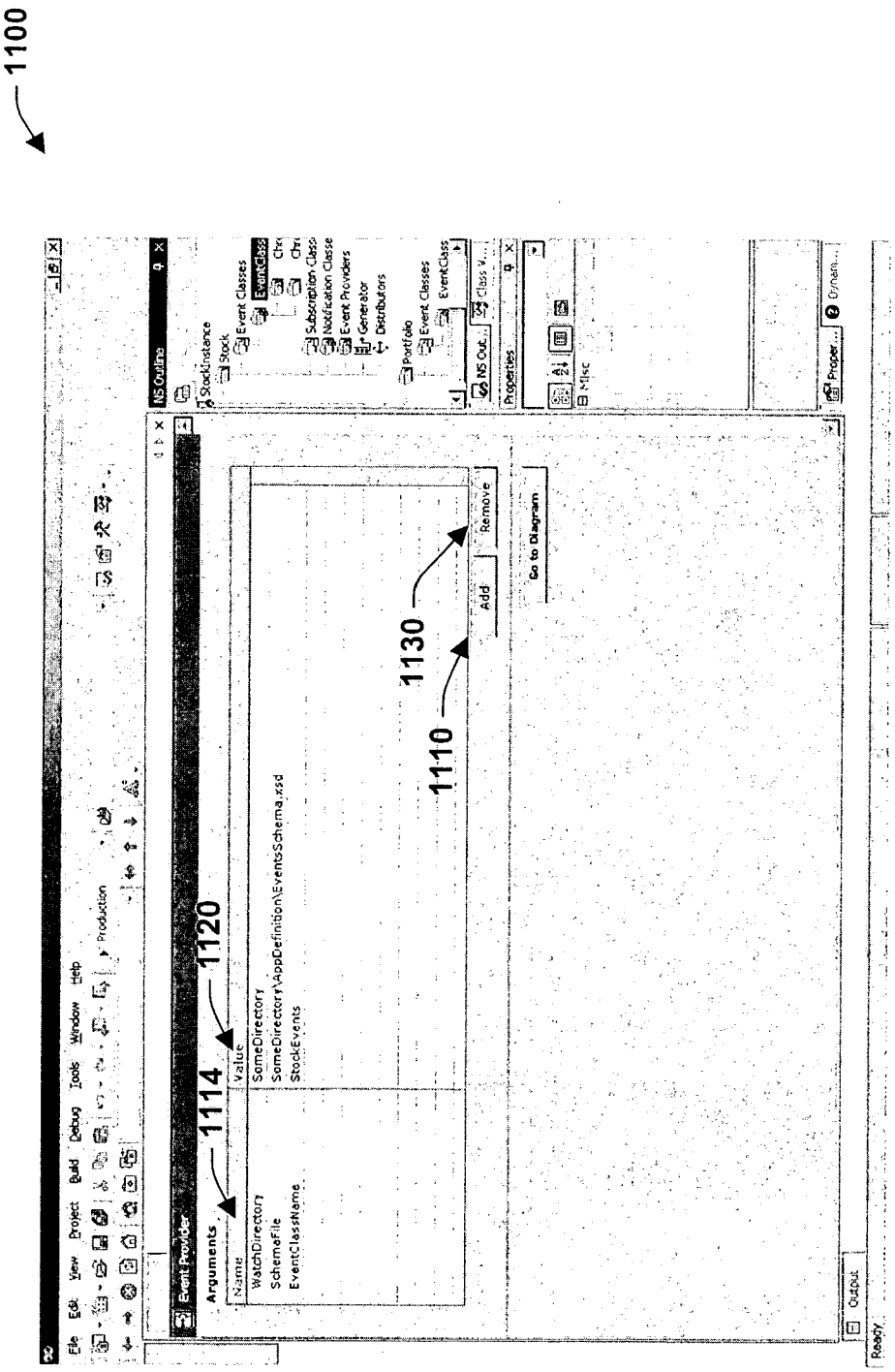

FIG. 11 depicts an Event Provider Sub-Editor 110. This sub-editor is used to define arguments for a hosted event provider.

An Add button 1110 creates another argument with default values for a name 1114 and value 1120.

A Remove button 1130 deletes the currently selected argument. Selection is defined like in the schema editors.

Figure 12:
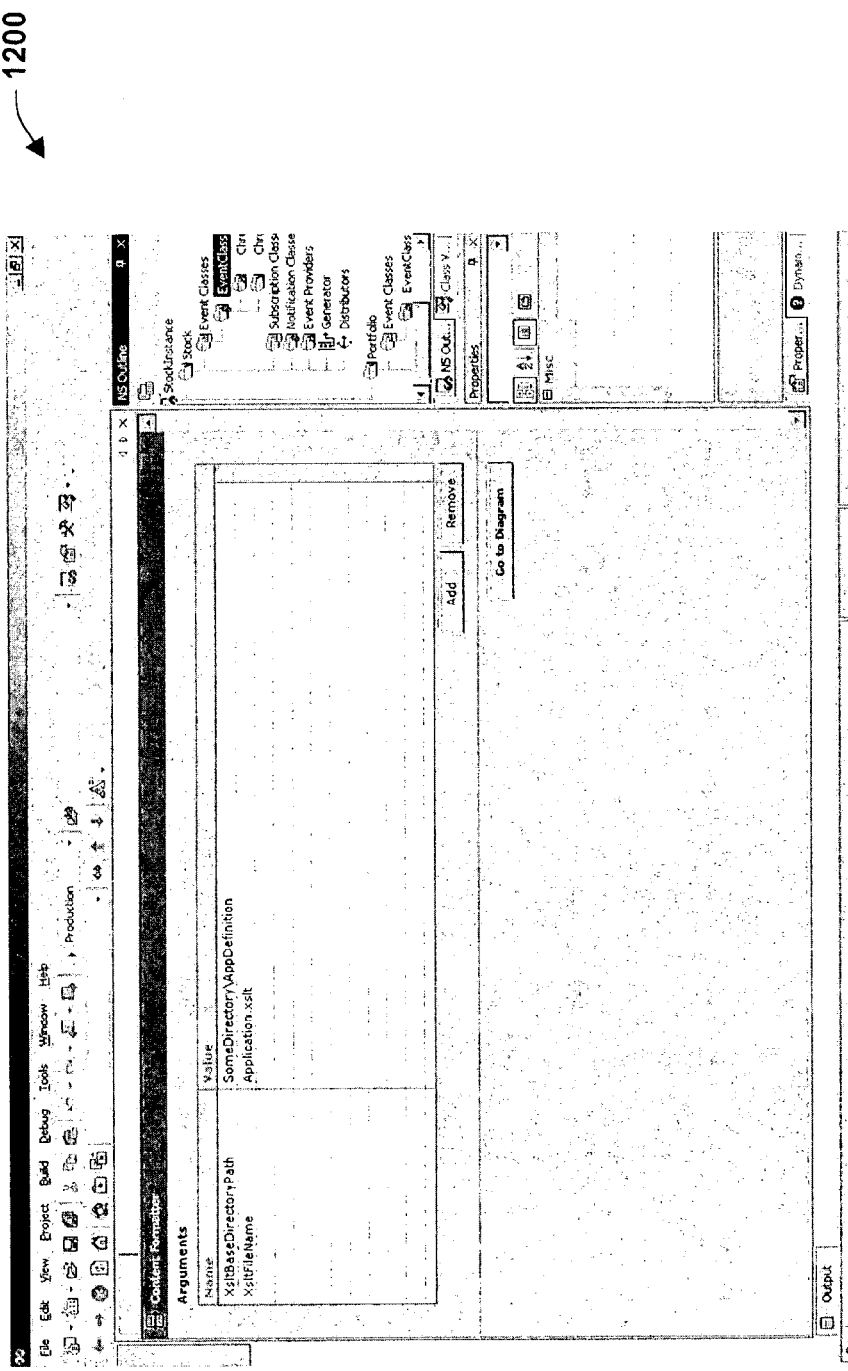
Figure 13:
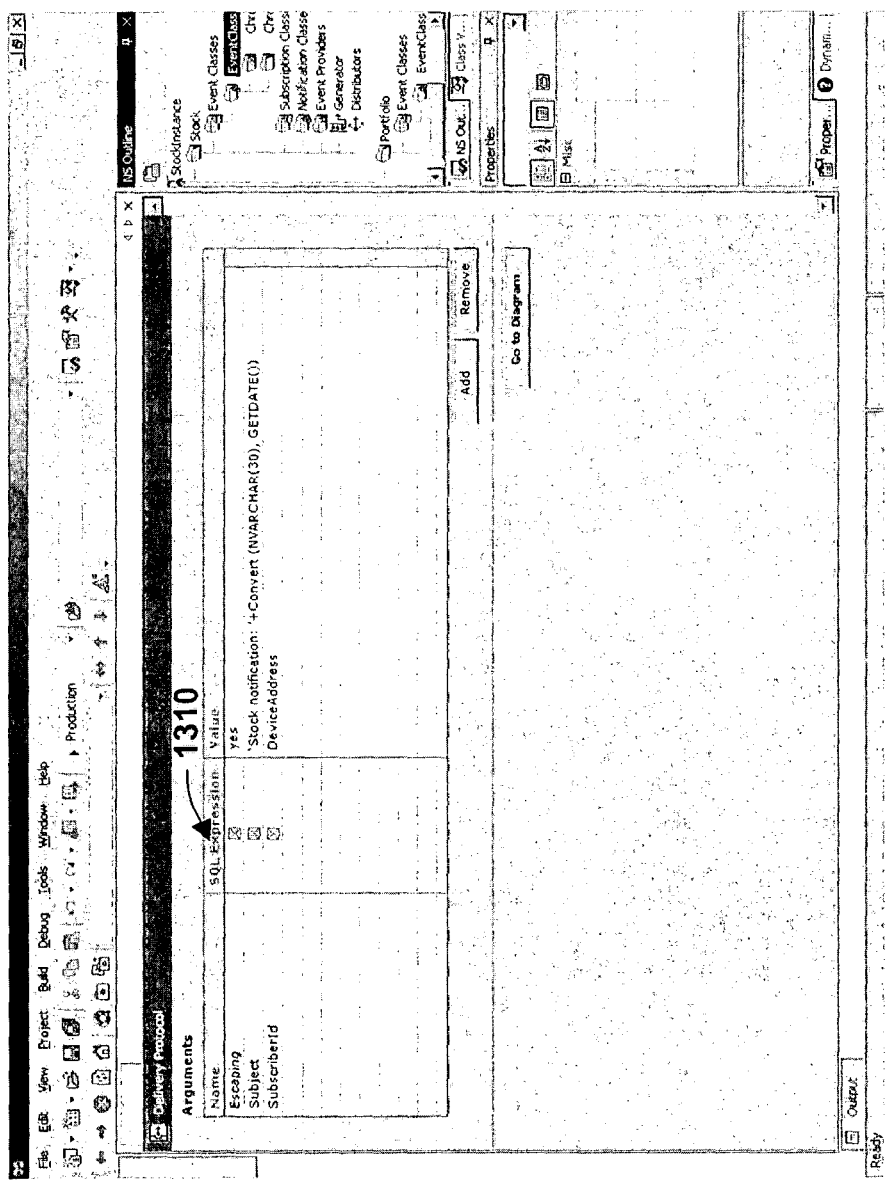

FIG. 12 illustrates a Content Formatter Sub-Editor 1200. This sub-editor is similar to the sub-editor for hosted event providers. FIG. 13 illustrates a Delivery Protocol Sub-Editor 1300. This sub-editor is similar to the one used for event providers. The main difference is that there's a column 1310—SQL Expression—which users can check to specify that the Value is a SQL expression, or leave unchecked to specify that the Value is hard coded.

Figure 14:
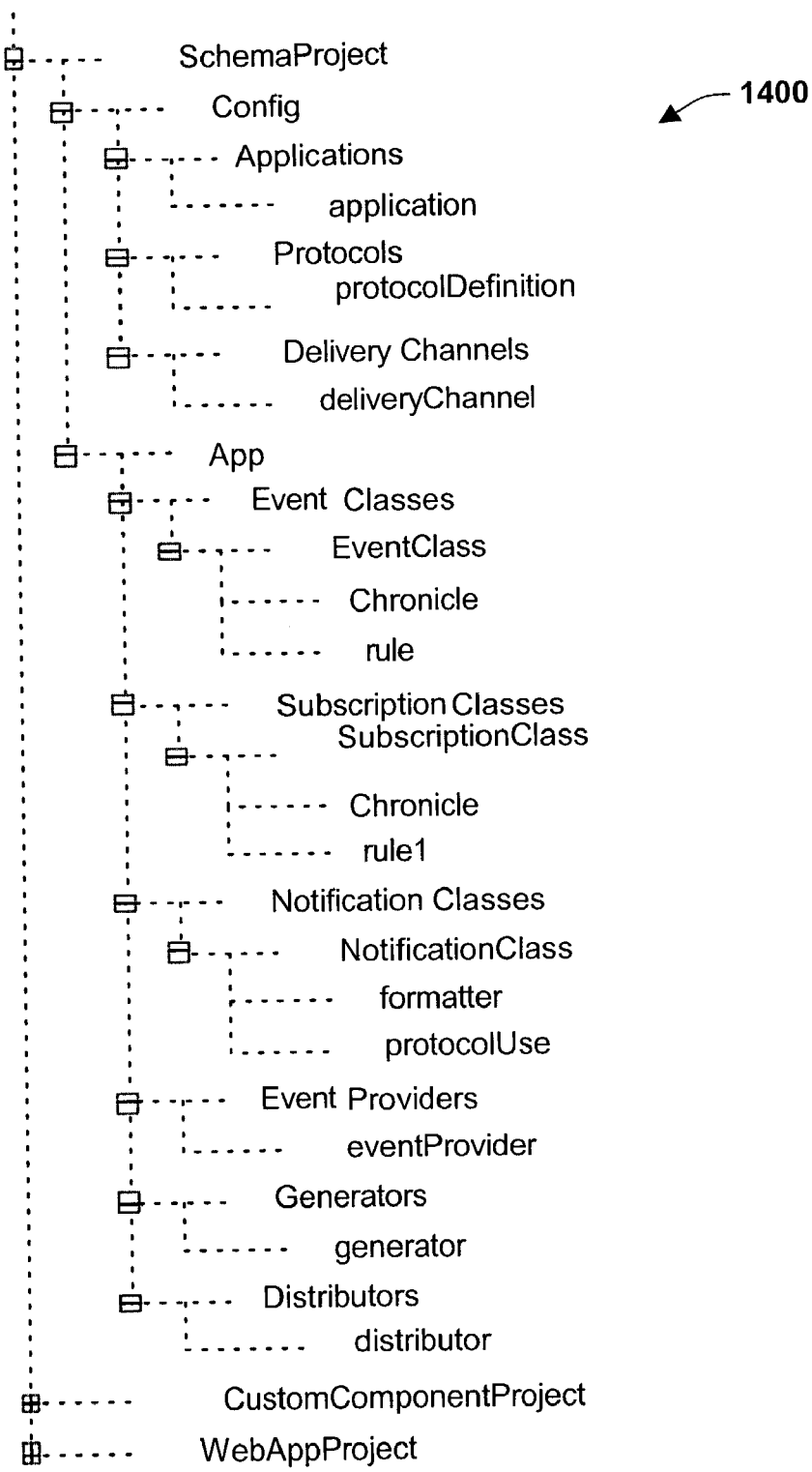
FIG. 14 illustrates a class view in accordance with an aspect of the present invention.

FIG. 14 illustrates a class view in accordance with an aspect of the present invention. When a project becomes sufficiently large, it is useful to be able to get a particular event or subscription class in a simple manner. At a primitive level, a user may navigate to a file and perform a text search. However, the user is often more interested in viewing the set of classes in their project in a hierarchical manner. Users may also desire to see these classes in relation to other projects in an application solution (e.g., the subscription management application wants to determine what subscription classes are available).

A class view display 1400 is employed by the developer to see the logical structure of classes in schema files. This is contrasted with the physical structure (file view) displayed in a Solution Explorer window, for example, which displays a list of files belonging to the project and is described below. In addition to being able to view the class hierarchy, the class view 1400 can also be employed to spawn class-level editors, in addition to the file level ADF editor.

At the top level of the class view 1400, each project type generally is responsible for populating the hierarchy beneath it. The object hierarchy of a Notification Services project is described as follows:

> One node for each Notification Services Instance class
> > One node called "Applications"
> > > One node for each application reference (i.e., pointer to an application specification)
> > One node called "Protocols"
> > > one node for each protocol definition
> > One node called "Delivery Channels"
> > > one node for each delivery channel
> > One node for each Notification Services Application class
> > > One node called "Event Classes"
> > > > One node for each event class
> > > > One node for each event chronicle
> > > > > One node for the chronicle rule if it is defined

```
One node called "Subscription Classes"
    One node for each subscription class
        One node for each subscription chronicle
        One node for each rule
One node called "Notification Classes"
    One node for each notification class
        One node for the formatter
        One node for each protocol supported by the notification class
One node called "Event Providers"
    One node for each event provider
One node called "Generators"
    One node for the generator
One node called "Distributors"
    One node for each distributor
```

Figure 15:
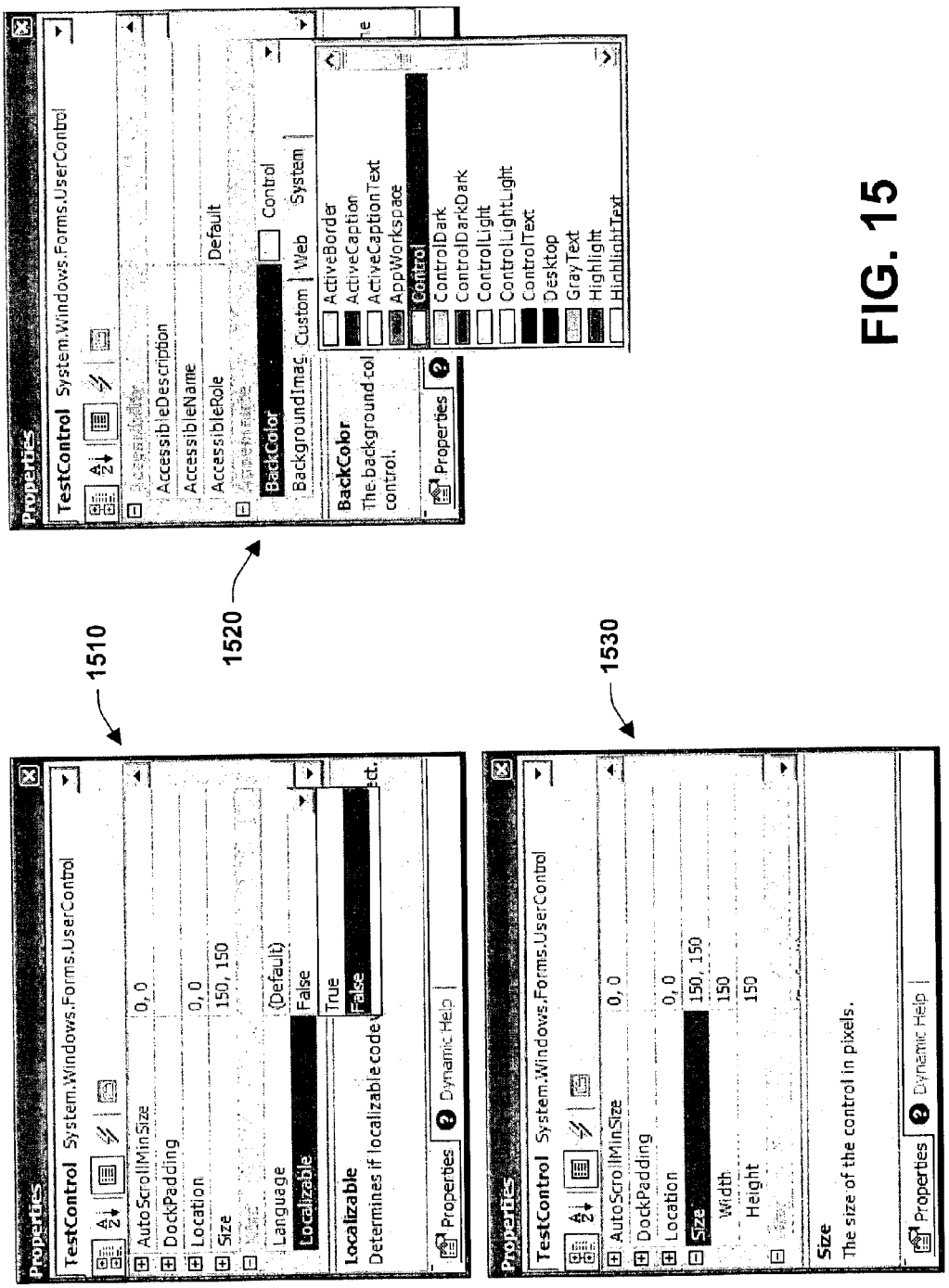
FIG. 15 illustrates editing options with class view in accordance with an aspect of the present invention.

FIG. 15 illustrates editing options with the class view described above. The class view is an outline view meant primarily for navigation (e.g., trying to find a particular class or rule. Editing is a secondary purpose of the class view.

There are typically two kinds of editors:

1. Document editors, which edit an entire object (e.g., event class or applications).
2. Property editors, which provide advanced ways for editing a single value in the property window (e.g., a color property in the property window can be edited using a graphical swatch).

Property editors generally fall into three categories:

In line editors—the text is typed directly in the right pane of the property window. This is used for string and integer properties.

Enumeration editors illustrated at 1510—the right pane in the property window has a drop down allowing a selection of values. This is used for properties whose value comes from a fixed set (e.g., Boolean properties have True/False values).

Custom editors 1520—the right pane has a button " . . . " which can be clicked to get a modal dialog. This dialog can then be used to set the value of the object visually.

Expandable properties depicted at 1530 have a "+" symbol to their left. When the "+" symbol is pressed, the sub properties are shown. This is useful for properties which have an array of values (e.g., event provider parameters).

Figure 16:
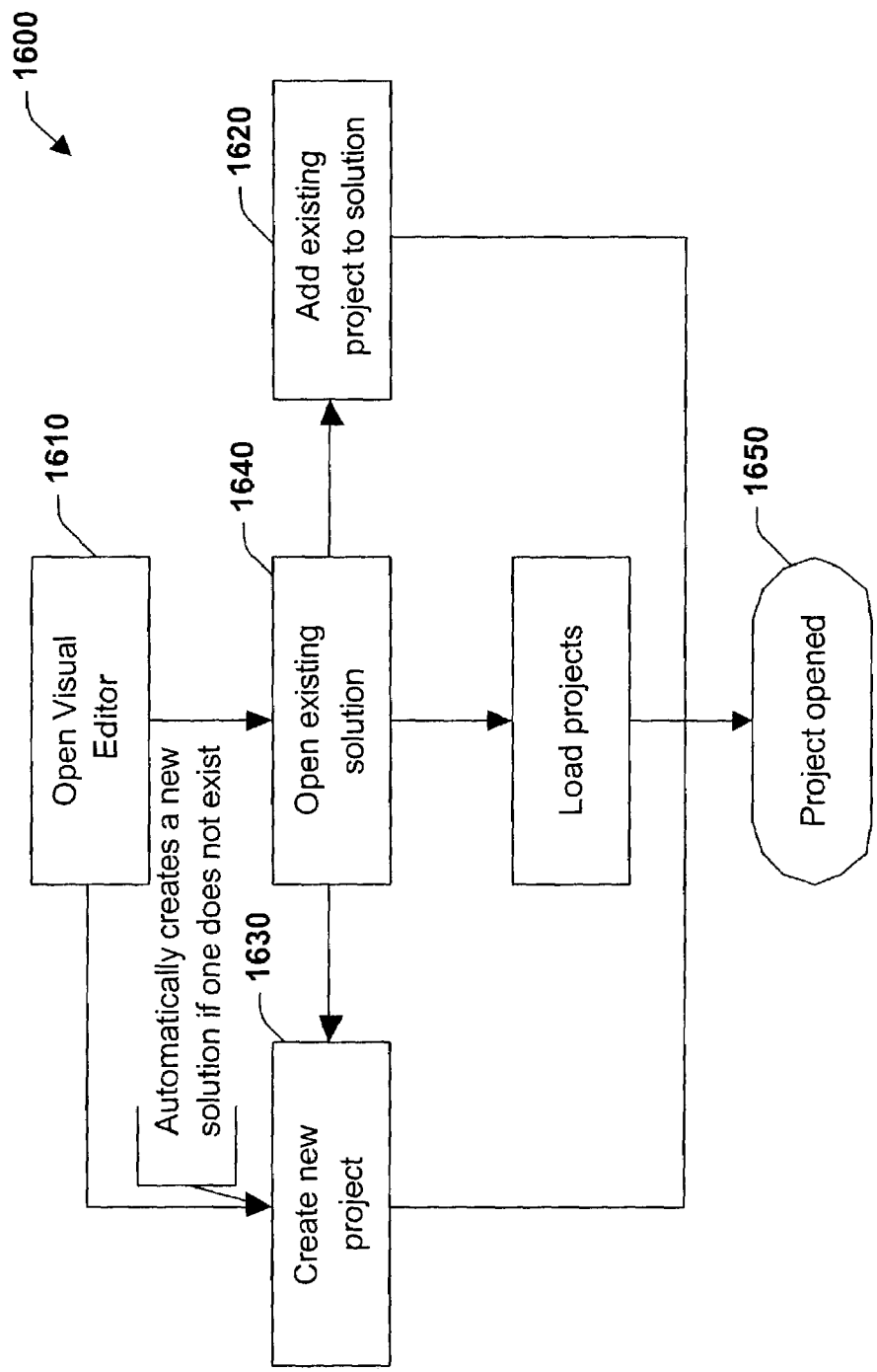
FIGS. 16 and 17 illustrate processes and interfaces for creating and managing projects in accordance with an aspect of the present invention.
Figure 17:
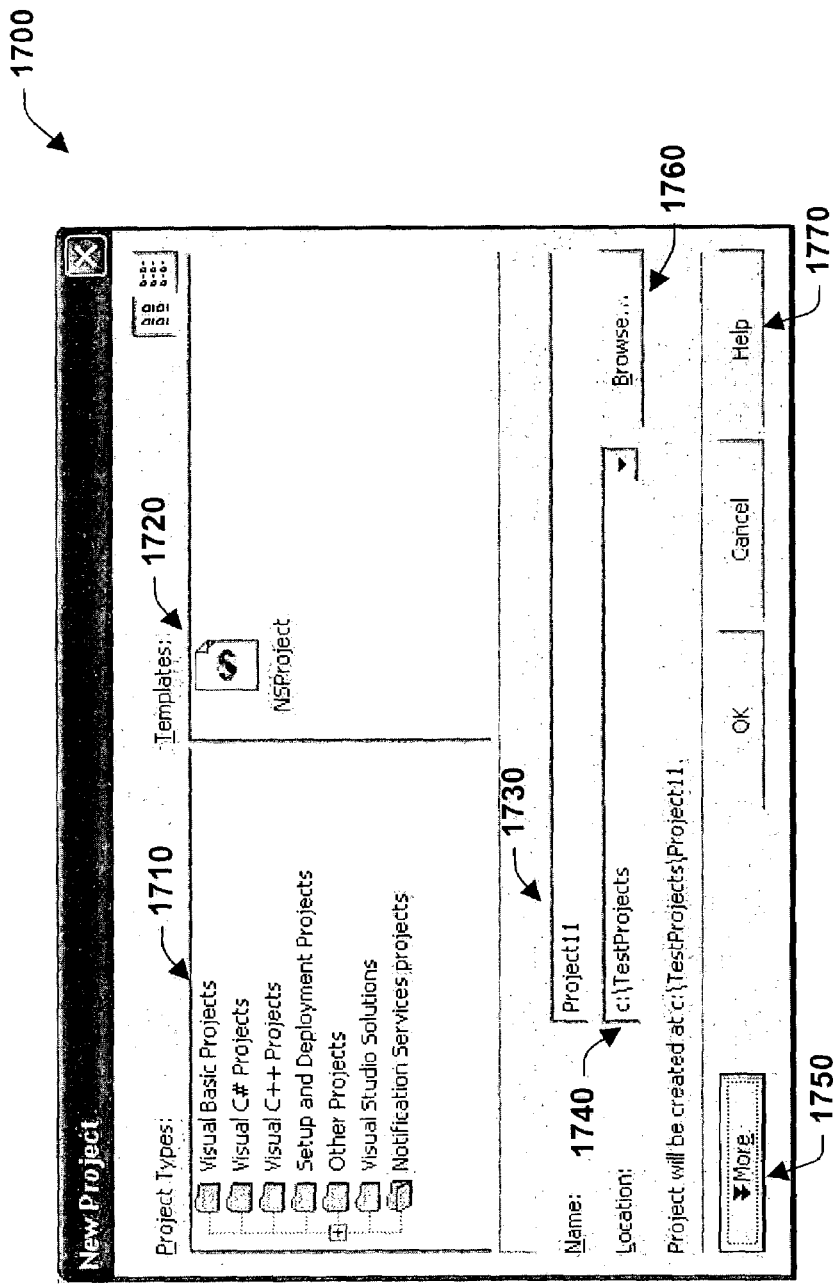

FIGS. 16 and 17 illustrate processes and interfaces for creating and managing projects in accordance with an aspect of the present invention. In this aspect, notification projects are created and manipulated. This includes functionality that is typically common to all project types. Thus, a project type is defined to manage items related to creating a Notification Services instance. A project can be viewed as an abstract concept. Logically, it is a container and organizer of the items that are required to implement a subsystem of a notification solution. In a visual editor, the project and the physical items that it contains are displayed as a sub-tree of the solution node in a Solution Explorer window, for example. The project is responsible for determining how its contents should be compiled when a "Build" command is received. It also determines which files are relevant as far as deployment is concerned.

FIG. 16 illustrates a diagram 1600 for opening a project in accordance with the present invention. A desktop editor developer generally works with a solution at a top level, wherein a solution contains projects. At 1610, the developer opens a visual editor. At this point, the developer may:

1. Create a new empty solution and add new or existing projects at 1620 (i.e., projects that have been created in other solutions and saved to disk) to this solution).
2. Create a new project at 1630, which creates a default solution.
3. Open a solution that has been saved to disk at 1640. This solution might have had projects added before it was saved.

When the solution has been opened at 1650, the developer can work on each project independently of the others, if desired. The basic method for the creation of a new project is similar for all project types. The project type developer creates a set of templates for the project type, wherein the templates are described below. The user selects one of these project types from a "New Project" dialog to create a new project based on the template.

FIG. 17 illustrates a new project dialog 1700 in accordance with an aspect of the present invention. In this dialog, there will be a set of folders on the left pane for the various project types at 1710, which in turn may contain subfolders. When a folder is selected in the left pane, the right pane at 1720 is populated with templates for the selected project type. The user selects a project template from the templates pane at 1720. A template refers to a variant of a project type. Each template may lead to different files being added to a project, or different settings being applied to a project. (e.g., a C# application and a C# class library are of the same "project type", in the sense the same set of items can belong to each project, the build process is similar and so forth). The controls on the dialog 1700 are described in the table below:

| Control | Description |
| --- | --- |
| "Project Types" pane 1710 | This pane contains a set of folders for the various project types registered on the machine. Each folder may have subfolders to organize the project templates |
| "Templates" pane 1720 | This shows an icon for each variant of the project type. |
| "Name" textbox 1730 | The name of the project. A default value is supplied by the project type, and the user can change this default. |
| Location textbox 1740 | The location where the project is to be created. This is typically a directory in the file system. The project can choose to interpret in any other way though, e.g. as a database server, web root etc. A default value, based on the value can be provided. |
| More button 1750 | The "More" button is available if the project is not being added to an existing solution. When this button is pressed, the user will be able to choose whether he wants to create a directory for the solution. |
| Browse button 1760 | This leads to a standard file explorer control, with which the user can select the directory for the "Location" textbox. |
| Help button 1770 | "Help" button leads to a help page on the various project types. |
| List/Icons view buttons | Shows the templates as a list of names, or as a set of icons. |

When a new project is created, or an existing project is added to a solution it is noted that a project is a collection of items. The following describes example items that can be contained in a Notification Services project. An item is any distinct physical entity which the project may want to refer to individually. These are typically components such as files, assemblies, folders, tables and so forth.

A Notification Services project can include the following types of items:

| Item name | Description |
|---|---|
| Instance (config) file | The xml file containing the instance configuration |
| Application (ADF) file | The xml files containing the application definitions |
| Folders | To organize files. These correspond to subdirectories of the project directory. |
| Miscellaneous files | Not any of the above. Might be needed for documentation, test, or for custom components e.g., XSLT files, FileSystem Watcher provider XSDs and so forth. |
| Reference to custom component assembly | References to custom component assemblies or projects. Using these, the schema developer can indicate which assemblies he intends to use. Generally, only the dll is required, the actual sources are not important. |

Figure 18:
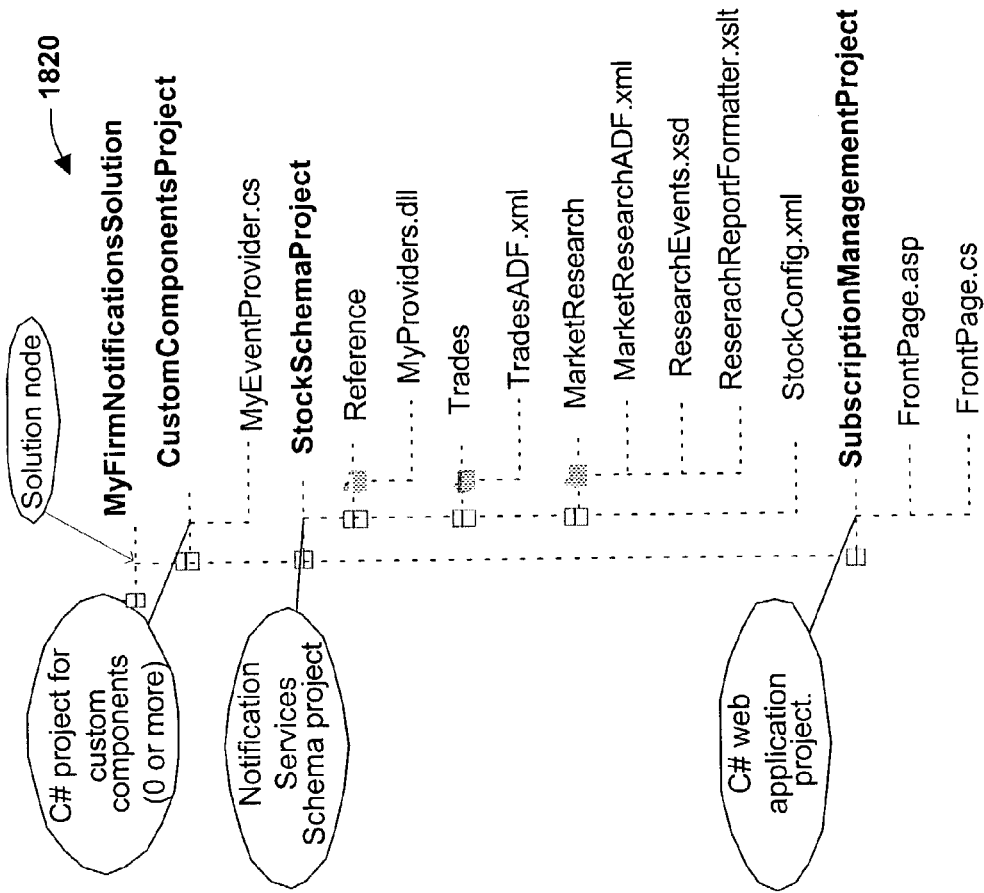
FIG. 18 illustrates file view aspects according to an aspect of the present invention.
Figure 18:
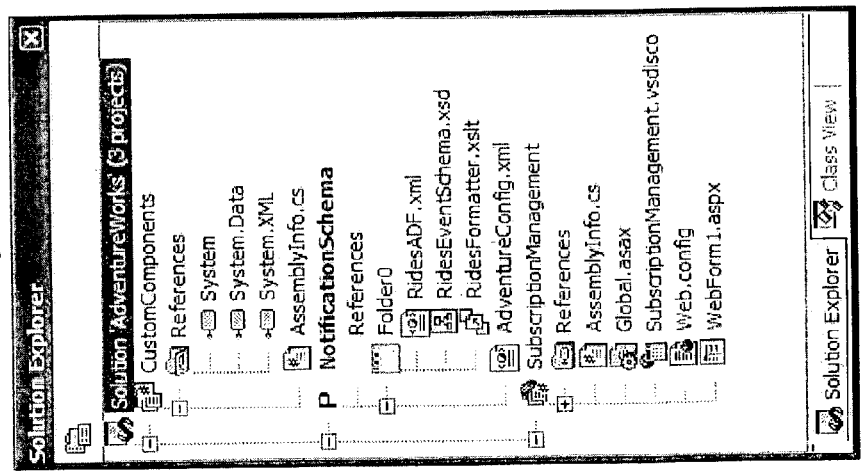

FIG. 18 illustrates file view aspects according to the present invention. In this aspect, the present invention supports a hierarchical display of the items in projects of a notification solution. This provides developer with a straight-forward, convenient and standard way to understand what is contained in projects, and also to add, remove and open items for editing. A tree can be displayed in a window, for example, as illustrated at 1810. The project type determines the hierarchy in which the items are organized, and the actions and property available at each node. The display 1810 depicts the hierarchical representation of projects that make up a current solution, and in particular, the hierarchical representation of the items in a Notification Services project. The root of the solution explorer tree is the current solution. Below it is a node for each project that is part of the solution. Each "project type" controls the display of the hierarchy below the project node (i.e., The C# project type displays a sub-tree for a CustomComponents project and so forth).

A hierarchy 1820 depicts various example nodes of a notification services project. Nodes illustrated in the diagram 1820 correspond to items that can be contained such as:

| Node | Item | Description/Value |
|---|---|---|
| Project node | Project file | Name of the project. This node represents the entire project. It is the root of the hierarchy for the project, and all other items are its descendants. |
| Instance node | Instance config file | Name of the file. This node represents a file whose contents indicate that it is an instance config file. It is displayed with a different icon for visual feedback to the user. |
| Application node | Application file (ADF) | Name of the file. This node represents a file whose contents indicate that it is an application ADF file. It is displayed with a different icon for visual feedback to the user. |
| Folder node | Folder | Name of the folder. This node represents a subdirectory of the project's directory. |
| References folder node | | References. This is a "virtual folder" under which the reference nodes will be placed. |
| Reference node | Reference to custom component | Name of the custom component assembly. This node represents an assembly which contains classes that implement custom providers. |
| Miscellaneous file node | Any file not mentioned above. | Name of the file. This node is used for files like XSLT files and event schema XSDs. |

Figure 19:
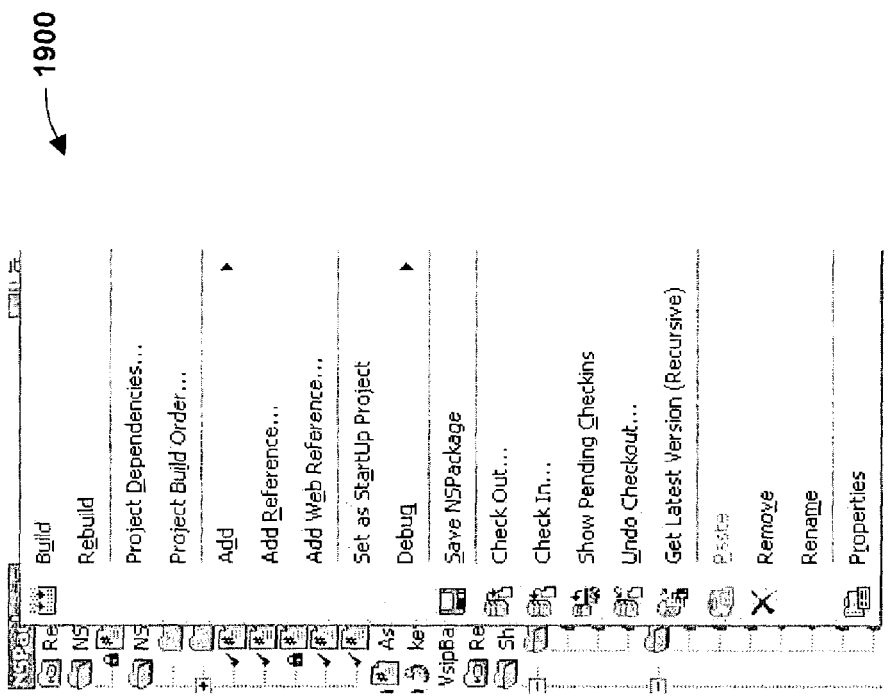
FIG. 19 illustrates a project node context menu that can be employed with the file views in accordance with an aspect of the present invention.

FIG. 19 illustrates a project node context menu 1900 that can be employed with the file views described above. The menu 1900 can include one or more of the following options:

| Action | Description | Custom |
|---|---|---|
| Build group | | |
| Build | Creates a Notification Services instance. | |
| Rebuild | Creates a Notification Services project. | |
| Clean | Deletes an existing instance of Notification Services. | |
| Register | Register the Notification Services instance. | Yes |
| Unregister | Unregister the Notification Services instance. | Yes |
| Project dependencies | Controls the build order in a multi-project solution. e.g., build the custom components project before building the schema project. | |
| Project build order | This leads to a standard project build order dialog. | |
| Add group | | |
| Add → | this leads into the Add menu, which has | |
| Add new item | Opens the "Add New Item" dialog for this project. From this dialog, new items can be added to the project. | |
| Add existing item | Opens the "Add Existing Item" dialog. From this dialog, a file that is already in the file system is added to the project. | |
| New folder | Creates a new folder as a subdirectory. A folder node with a temporary name is created, and left in an editable state. After the editing is done, the directory is created. | |
| Add reference | Opens the component picker dialog. From this dialog, dll files in the file system can be added. The output of a C# (or other type code) project could also be added. | |
| Run group | | |
| Set as startup project | In a multi project solution, one of the projects is started when F5 is pressed. | |
| Debug → | Leads to the debug sub-menu | |
| Start new instance | Runs the application for this project. | |
| Save group | | |
| Save <ProjectName> | Starts the save project sequence. | |
| Source code control group | | |
| Check Out | Checkout the project file. | |
| Check In | Check in the project file. | |
| Show Pending Checkins | Display the list of checked out files in the Source Control window. | |
| Undo Checkout | Restore the project file from the version in source control. | |
| Get Latest Version | Get the latest versions of all the files in the project | |
| General node operations group | | |
| Paste | Paste a file (or files) copied from the same or another hierarchy. | |
| Remove | Remove the project from the solution. Does not delete the project from disk. | |

-continued

| Action | Description | Custom |
|---|---|---|
| Rename | Rename the project. | |
| Properties | Displays the properties for the project in the properties window. | |

Figure 20:
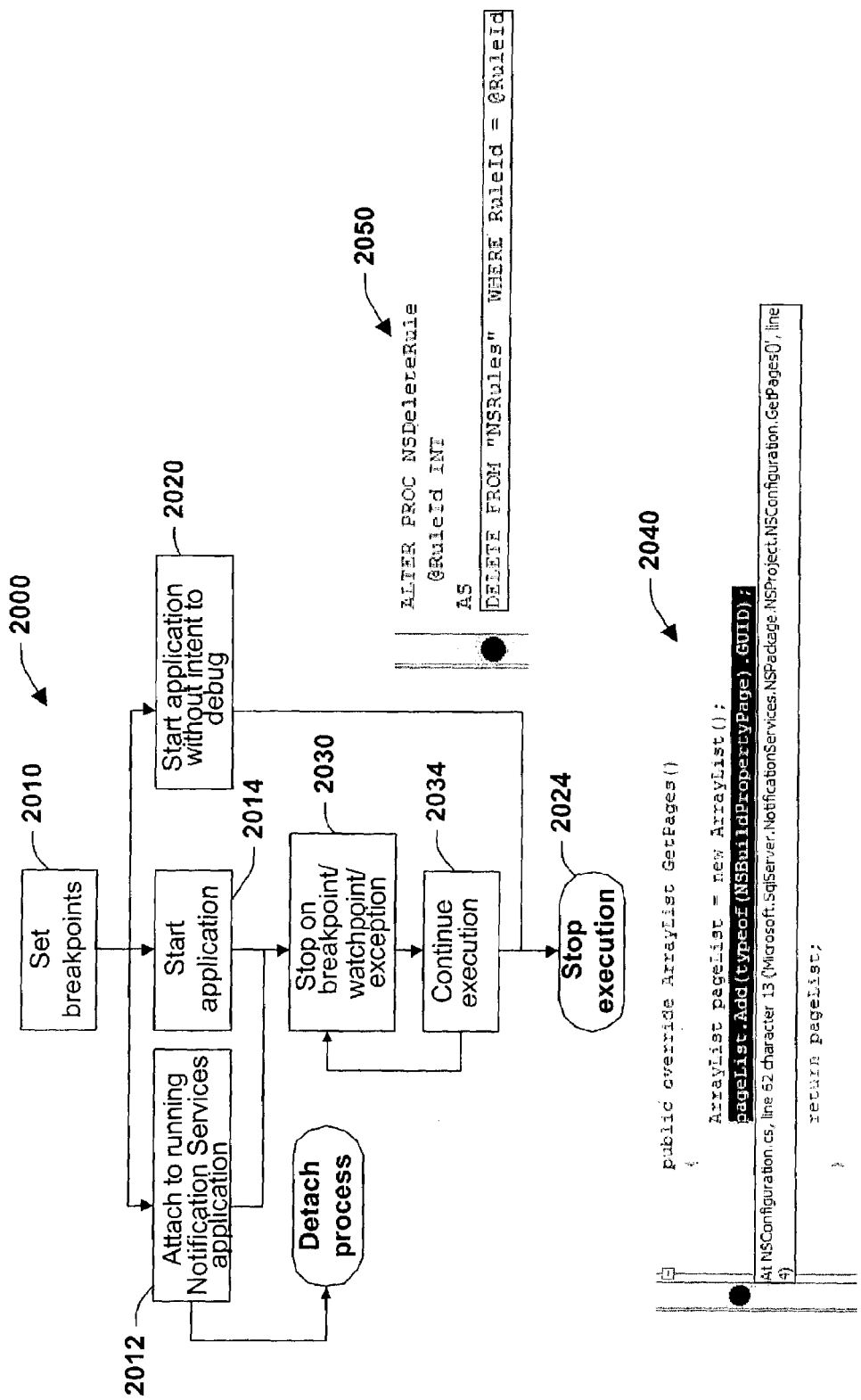
FIG. 20 illustrates a debugging process in accordance with an aspect of the present invention.

FIG. 20 illustrates a debug methodology 2000 for a notification application in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The process 2000 can be employed with other systems and/or processes described herein. As noted previously, the present invention provides a unified debug environment that may encompass one or more languages, styles, and program structures. Thus, the present invention can enable debug operations within various components of a notification application. This can include providing debug options for a plurality of languages which can be set from a higher-order abstraction or application that enable selecting the options and applying the selections to one or more portions of the notification application. Such options include setting breakpoints, stopping on break points, stepping (e.g., single or multi-instruction stepping), continuing after break, stopping on an exception or condition, inspecting application states, viewing a call stack, and setting conditional breakpoints or watch points (e.g., stopping application at a point and observing how an item changes).

A developer trying to debug a Notification Services application may be interested in the following events:

1. Debug errors that occur in executable sections that they have authored
    a) Custom component code authored
    b) SQL rules that they have entered in the ADF
2. Errors or events raised by the Notification Services runtime virtual machine. These events do not have direct correspondence to procedural code that the developer typed. Examples of these type of events are
    a) Rule firing failed
    b) Event batch created There are typically two styles of debugging such as:

| | |
|---|---|
| Offline testing-The system as a whole is not executed. Individual components are tested within a scaffold, and significant effort is required to ensure that the pre-test state is set up correctly. | Online testing-The system as a whole is executed without scaffolding. Great care is not required to set up the test state. However, some states may be difficult to achieve |
| "Point" debugging-The goal is to test a particular feature or component. The path taken to reach the component's state is not important. | "Flow" debugging-The goal is to test a scenario i.e. a sequence of actions. The sequence might be modified midstream to investigate alternate paths. |
| Repeatable-It is important that the tests be deterministic and repeatable. | Diagnostic-Repeatability is not a major concern. It is known (by some means) that a problem exists in the system, and the goal is to find out the cause of the problem. |

1. Preventive—This is similar to unit testing.
    a) The entire system is not run until each part is tested in isolation. i.e. offline testing.
    b) This is also called point debugging, since a specific "point" in the application is tested, independent of how it would be reached in a running application.
    c) These tests are reproducible, but might be difficult to create in some cases.
    d) Testers prefer this style of "debugging" i.e. quality assurance.
2. Reactive
    e) The system is run with minimal preparation. A typical workload is used as a test case. This in online testing.
    f) Breakpoints are set at various places in the application code to pause the system and examine the state for errors.
    g) This is also called "Flow" debugging, since one is testing a path that the application takes, rather than a single point.
    h) These tests can take less preparation.
    i) Developers prefer this style of debugging.
3. Tracing—This is the printf style of debugging, which can be considered a hybrid between the two options.

Example of preventive testing—The developer wants to test that a rule is correct. He enters sample data in various tables, and then executes the rule (say with Query Analyzer). He does not have to run Notification Services.

Example of reactive testing—The developer runs the system and adds some events to the system. He sets a breakpoint on the rule, so that execution is stopped before the rule is fired. He examines the state of the system before the rule is fired, single steps through the rule, examining the state along the way. While the rule is in execution, he observes that the Notifications table does not have the correct set of rows. Looking at the rule again, he observes that the WHERE clause is incorrect.

A typical application has components that work against multiple runtime engines (virtual machines). In particular, a Notification Services application uses at least the following virtual machines 1. Common language runtime for custom components.
2. SQL runtime for the rules in the ADF.
3. Notification Services runtime for the orchestration of the ADF code.

In order to debug an application which uses multiple virtual machines, one or more debug engines may be employed per virtual machine (some debug engines may do multiple virtual machines), wherein a debug engine is a component which analyzes the internal operation of a virtual machine that implements a language. It has the ability to set breakpoints, pause execution, inspect the state of the virtual machine and so forth. Such debug engines may include:

1. CLR debug engine.
2. SQL debug engine.
3. Notification Services debug engine.
4. Other debug Engines.

As noted above, the debugging experience generally includes:

Setting breakpoints in the appropriate code files.
Running the system until a breakpoint is hit.
Examining variables in a watch window.
Continuing the execution of the application.

As one example, breakpoints can be set in the following manner:
1. Custom component breakpoints: Open C# file containing the source, set the breakpoint on the desired line
2. Rule breakpoints: Expand an application window to find the appropriate service provider, and then set a breakpoint in the SQL source.

Referring back to FIG. 20, a debug process 2000 is illustrated. Proceeding to 2010, one or more breakpoints are set and can be applied to a running application at 2012. If an application is not currently running, an application is started at 2014. If the application is started without debugging options enabled, at 2020, the process proceeds to 2024 and ends. After the application has started at 2014, notification application program execution may be stopped at 2030 due to hitting a breakpoint, watch point, exception, and/or other factor as noted above. If desired after troubleshooting, the developer can restart the program at 2034.

The following illustrates some example techniques for setting breakpoints in accordance with the present invention, although it is to be appreciated that other techniques may be employed.

In a C# example, the developer opens a file containing desired code. The developer then moves to the line where they want to set a breakpoint, and press F9 (or any other breakpoint key). The line shows up in red with a circle on the left edge of the document window containing the source file as illustrated at reference numeral 2040 of FIG. 20. At reference numeral 2050 of FIG. 20, a breakpoint is set in an SQL stored procedure corresponding to a rule. As noted above, debug options can be provided for a plurality of programming languages that may be employed with a notification services application.

Figure 21:
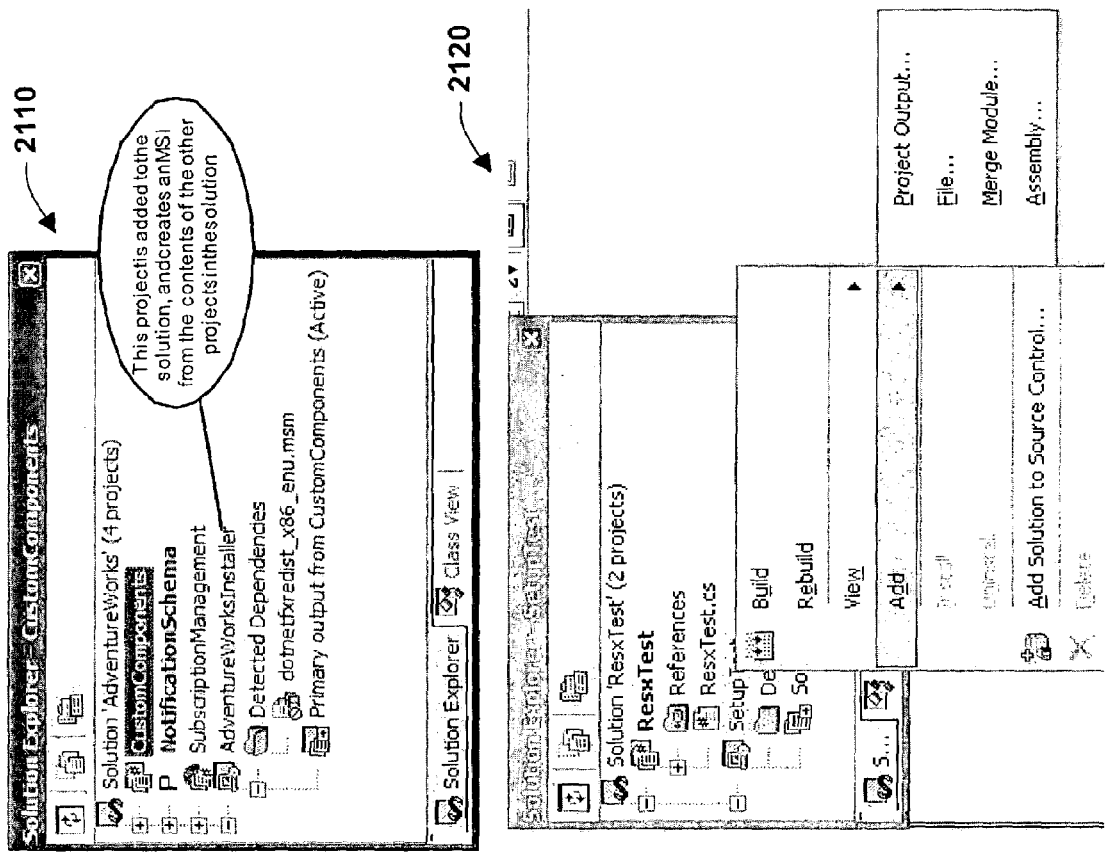
FIG. 21 illustrates deployment options in accordance with an aspect of the present invention.
Figure 21:
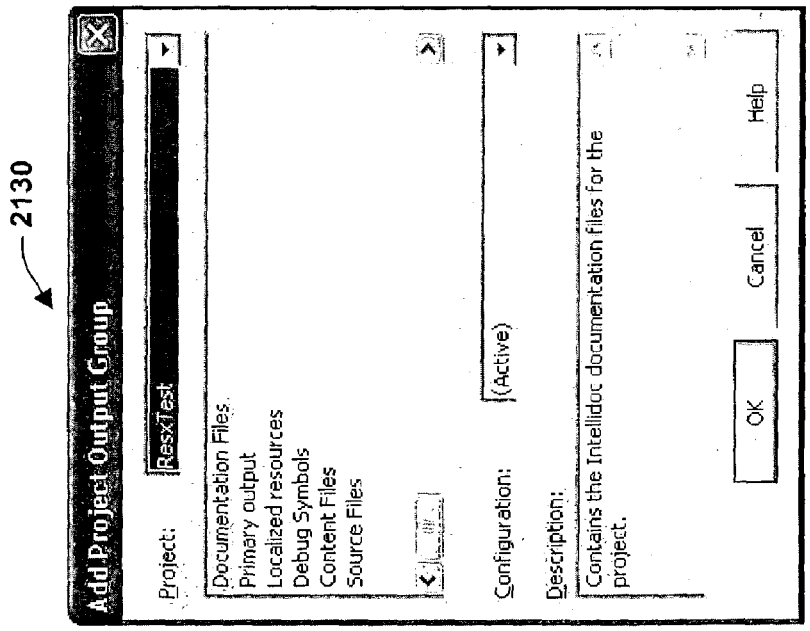

Referring now to FIG. 21, deployment options are illustrated in accordance with an aspect of the present invention. After the developer has authored the files that describe a project, then, built and debugged the project, it is typically desirable to cause an application constructed from the project to run on a different environments such as test or production environments, for example.

To deploy a Notification Services solution, a deployer generally performs the following:

1. Move the following sets of files to the correct locations
   a) Notification Services schema files
   b) Custom component assemblies
   c) Custom component data files such as content formatter XSLTs and event data XSDs
2. Create instance databases
3. Register the instance
4. Enable the instance In addition, when the solution is uninstalled, the developer may:
1. Disable the instance
2. Unregister the instance
3. Delete the instance databases
4. Remove the files that were installed A Windows installer MSI (or other type installer) is suitable for packaging the files required in step 1 above and for executing the commands required in steps 2 and 3 above. It is also a standard vehicle for deploying applications. While MSIs are widespread and very convenient, some development teams prefer to just copy an entire subdirectory and run a script afterwards—this is known as the "xcopy" style of deployment. A Notification Services solution is deployed in many different environments. After the basic code is developed in the development environment, the solution may be deployed in a "test" environment, a "staging" environment and a final "production" environment, for example. Each of these environments may have unique characteristics, which the deployment process supports.

A typical Notification Services solution in Visual Studio (or other desktop design application) may include the following projects:
1. Schema project
2. Custom component project
3. Subscription management project
4. Test project To handle deployment, the developer will add one more project to this solution—a "Setup" project. This is a standard Visual Studio project type, and can be created using "File→New Project→Setup and Deployment Projects→Setup project," for example.

At 2110 of FIG. 20, a project "AdventureWorksInstaller" is a setup project. It has included a custom component assembly from a "CustomComponents" project. In general, it would also include output groups from a "NotificationSchema" and "SubscriptionManagement" projects. At 2120, an add menu is illustrated for a setup project node that includes options such as project output, file, merge module, and assembly. It may be tedious and error-prone to add files individually to the setup project. The Visual Studio Setup project can copy groups of files of the same type from other projects in the solution. This facilitates that if a new ADF file is added to the Notification Services project, it is automatically added to the "Setup" project. One aspect to note in the menu 2120 is the "Project Output" item. Each project in a solution can contribute one or more groups of files for deployment (e.g., a C# project has a "Source Files" file group). A developer can add this entire group to the Setup project, instead of adding the source files one at a time to the setup project. A project output group menu is illustrated at 2130.

For a Notification Services project, the following output groups may be included:
  a) Schema files—the ADF and configuration files
  b) Custom component assemblies
  c) Miscellaneous files—files in the Notification services project which are not included above.
  d) Script files—these are auto-generated files used to create or register the instance.

Script files are generally not included in the "Miscellaneous files" group because they do not belong to the project—they are generated on the fly at build time. In addition, the developer could add components from any other project in the solution, or any other files in the file system. This is entirely up to the developer and is not relevant to this document.

A single "setup" project can be built many times, each time with a new configuration (i.e., it can be built in the test configuration, or the production configuration and so forth). Each build creates a new MSI package, and places the MSI in a directory bin\<configurationName> under the Setup project's directory. To install the solution on a particular environment, the deployer would copy the MSI from the appropriate subdirectory and run it.

Figure 22:
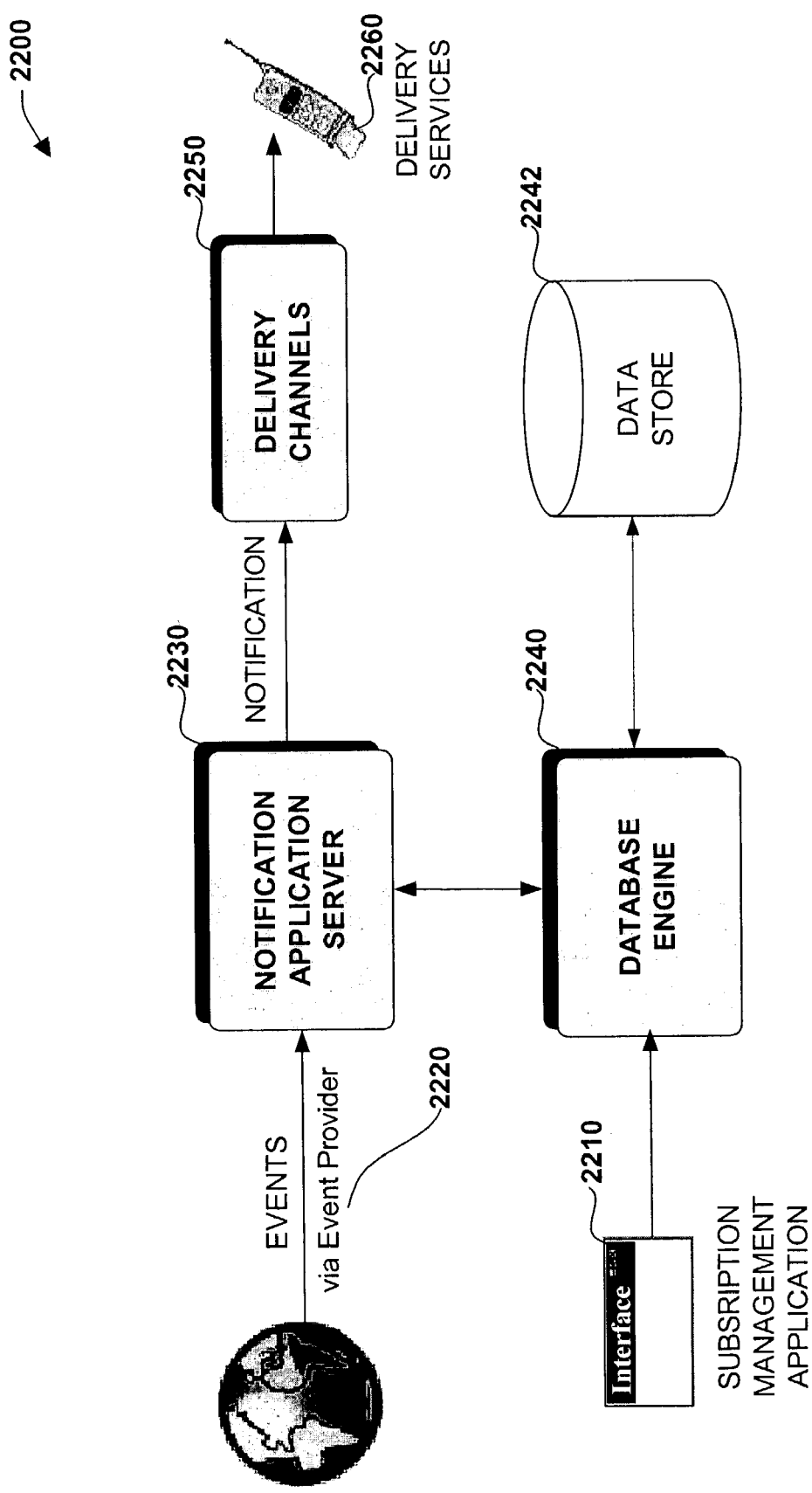
FIG. 22 is schematic block diagram of a notification application architecture in accordance with an aspect of the present invention.

Referring to FIG. 22, a system 2200 illustrates a notification application architecture in accordance with one aspect of the present invention. The notification system 2200 facilitates delivery of information to entities that have subscribed to an application. The system 2200 provides for high-scalability and affords for disseminating information to subscribers in a desired manner according to specific subscriber preferences. A subscriber is an entity (e.g., a person or application) that has subscribed to the notification system 2200. A subscription in accordance with the present invention can be an expressed interest in certain information (e.g., stock price or results of a sporting event), and the specification of a delivery mode (e.g., e-mail, voice mail, delivery via PDA, desktop computer, cellular telephone, television . . . ). Moreover, the present invention also provides for taking into consideration an individual's present state and associated delivery preferences according to present state. Thus, the notification system provides for dynamically modifying deliver modes given the type of information to be delivered, the criticality associated with the information, the subscriber's present state, and the deliver preferences given the aforementioned other parameters. One aspect of the invention that facilitates the system 2200 providing such highly scalable notification services is the employment of modeling subscriptions as data. Such subscription modeling mitigates the need to run queries individually per event per subscriber. Accordingly, numerous events can be concurrently processed with respect to a plurality of subscribers and relevant notifications provided to the respective subscribers in a meaningful manner in accordance with individual subscriber preferences.

Information that subscribers are interested in is collected as events. For example, a stock price at a specific time can be an event, as is a sports score, or a product delivery message—almost any suitable real world "happening" can be expressed as one or more events in accordance with the subject invention. A notification is a message delivered to a subscriber-specific device that contains information related to a subscription. A notification might contain a message about a new high value for a specific stock or the final score for a sporting event for example. The server notification services provide interfaces for gathering subscriptions and events, and then produces notifications based on this data.

Instead of treating individual subscriptions as queries, the notification system 2200 treats individual subscriptions as parameter data (e.g., an application developer can define a set of parameterized queries, each of which can be a subscription class)—evaluation of large numbers of subscriptions becomes a set-oriented data processing problem, for which database engines (e.g., SQL server) are well suited. This is a foundation of the notification system-programming framework of the present invention. In this model, event-triggered subscriptions are evaluated by simply executing a database join between events and a potentially large set of subscriptions. In general, the notion of modeling subscriptions as data is based on an assumption that if the notification system 2200 defines various domains, then many queries will have a common structure. For instance, many subscribers are interested in stock values, but at a finer granularity respective subscribers desire information about different stocks at different values. Thus, an interest in a particular stock can be expressed as "STOCKSYMBOL" and "TRIGGERPRICE" so as to provide a common framework or parameter(s) for such information. The semantics of how these parameter values are interpreted in relation to the event data can be are defined by the application. Thus, the application fixes the logic of how subscription parameters are interpreted (e.g., one app may want to alert when current price>trigger price and another may want to alert when current price<trigger price)—such semantics can be resolved in advance by the application developer, and designed such that a subscriber cannot introduce new semantics.

As discussed in greater detail below, the subject invention also encompasses a programming model for building subscription applications. In subscription applications a user establishes subscriptions or declarations of interest in certain kinds of targeted information. Thereafter, when the information becomes available, the subscription application sends a notification to the subscriber. A function of a subscription application is to match incoming data with the set of user subscriptions to determine what notifications need to be delivered. The subject programming model allows an application developer to write a small amount of application specific code (e.g. a mix of XML, SQL, C#, C++, VB and other languages suitable for support by the .NET framework) to build a fully-functional, rich subscription application. To enable such functionality, an execution engine can be built on top of SQL Server and the .NET frameworks, for example, that implements fundamental data constructs and execution semantics common to subscription applications. Thus, the subject programming model reduces development time, facilitates application maintenance and increases application efficiency by leveraging the power of a server, for instance SQL Server, to do subscription and event matching.

The subject invention includes a declarative programming model for building subscription applications. The programming model provides a base framework for the structure of applications; and a developer can adapt the base framework to build a specific application.

With respect to the high-level schematic illustration of the system 2200, five components of notification services cooperate to provide the functionality described above. A subscription management application 2210 provides an interface for subscribers to submit subscriptions as input to the system 2200. In particular, the subscription management application 2210 provides numerous application programmer interfaces (APIs) that facilitate entities to provide subscription services via the system 2200—the APIs are discussed in greater detail infra. Event data can also gathered from external sources via an event provider 2220. For example, an event provider in accordance with the present invention can gather or be pushed relevant events from a plurality of resources (e.g., newspapers, magazines, websites, libraries, individuals, employers, government(s), etc.). A database engine 2240 stores events and/or subscriptions in a data store 2242, and also runs statements, like Transact-SQL statements, and stored procedures. It is to be appreciated that the database engine 2240 can also process events versus subscriptions in real-time without persistently storing information. A notification application server 2230 processes subscriptions based on a set of events and ultimately generates notifications that are delivered to subscribers, and which can be stored in the database 2242 if desired. Finally, delivery channels 2250 route the generated notifications to delivery services 2260, which can include, but are not limited to, Exchange servers, SMS servers, and .NET Alert Web services.

Figure 23:
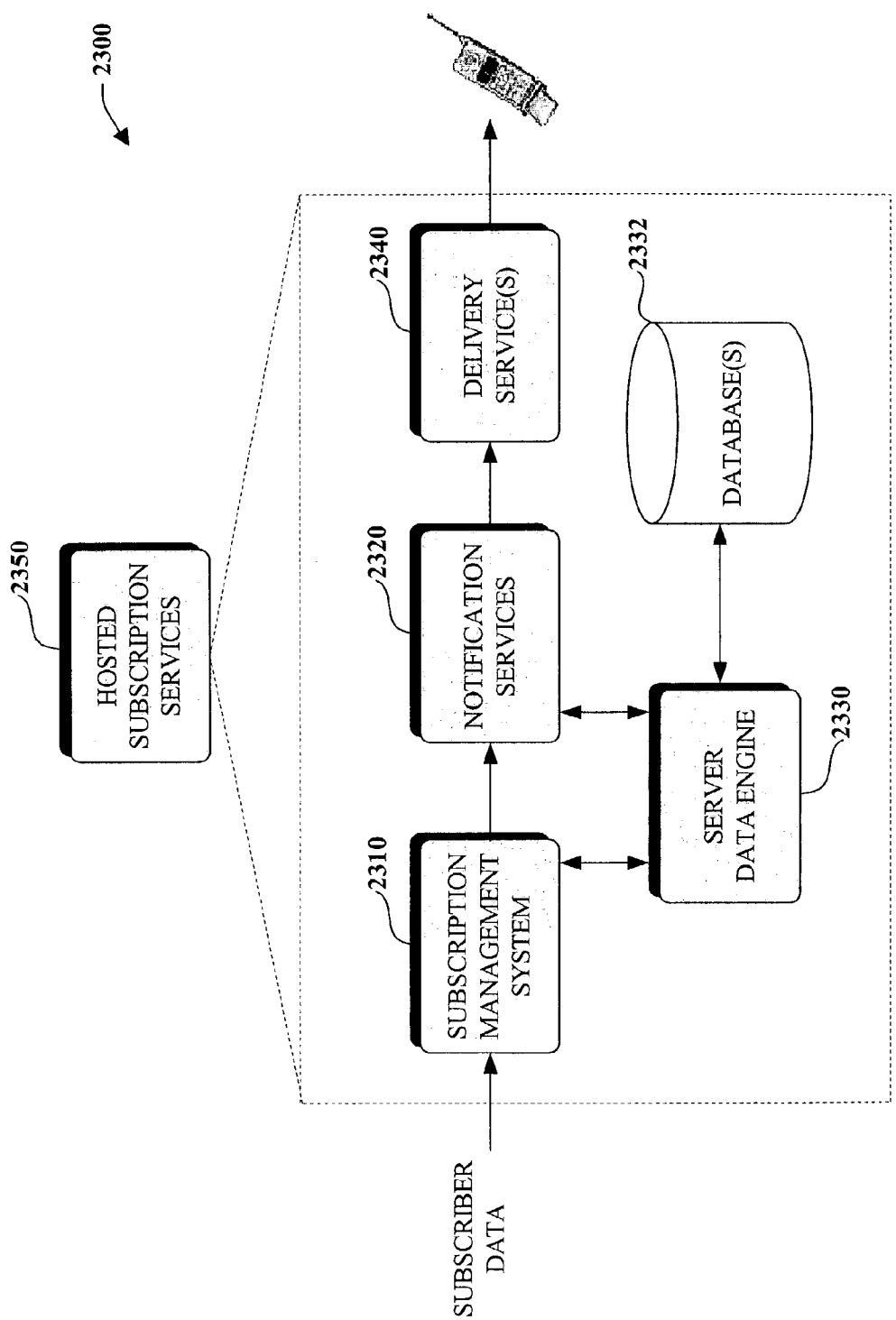
FIG. 23 is a schematic block diagram of a notification creation and distribution system in accordance with an aspect of the present invention.

FIG. 23 illustrates a notification creation and distribution system 2300 in accordance with an aspect of the present invention. The system 2300 includes a subscription management system (one or more subscription management applications) 2310, notification services 2320, a data engine 2330, database(s) 2332, delivery services 2340, and one or more subscription services 2350 hosted by the notification system 2300. The server database engine 2330 provides for processing and storing instance and application data. In particular, the server database engine 2330 stores and retrieves instance and application information from database(s) 2332. The data engine 2330 also provides other services employed by the notification services 2320. For example, the notification services 2320 can employ Transact-SQL language to join event and subscription data via the data engine 2330. Such integration provides scalable performance gains, because the data engine 2330 is likely to be highly optimized for joins as a result of the information processing capabilities afforded by SQL services. The subscription management system 2310, provides a hosting environment for user interfaces that collect subscriber and subscription data as well as accommodate a variety of unique subscription services 2350. The subscription management system can employ a Windows® application for submitting subscriber and subscription data, or can use an automated process for loading subscriber and subscription data from another system. The delivery services 2340 (e.g., .NET Alerts and Microsoft Exchange Server) receive notifications from the notification services 2320 and send the notifications to appropriate subscribers.

Functionally, events are submitted to the server data engine 2330 through a hosted event provider in notification services 2320, or through a non-hosted event provider outside of notification services. If employing a non-hosted event provider, another system may be used that supports the event provider, such as a Web server. In addition, it is appreciated that the notification services 2320 can be deployed on a single server or scaled across multiple servers.

Figure 24:
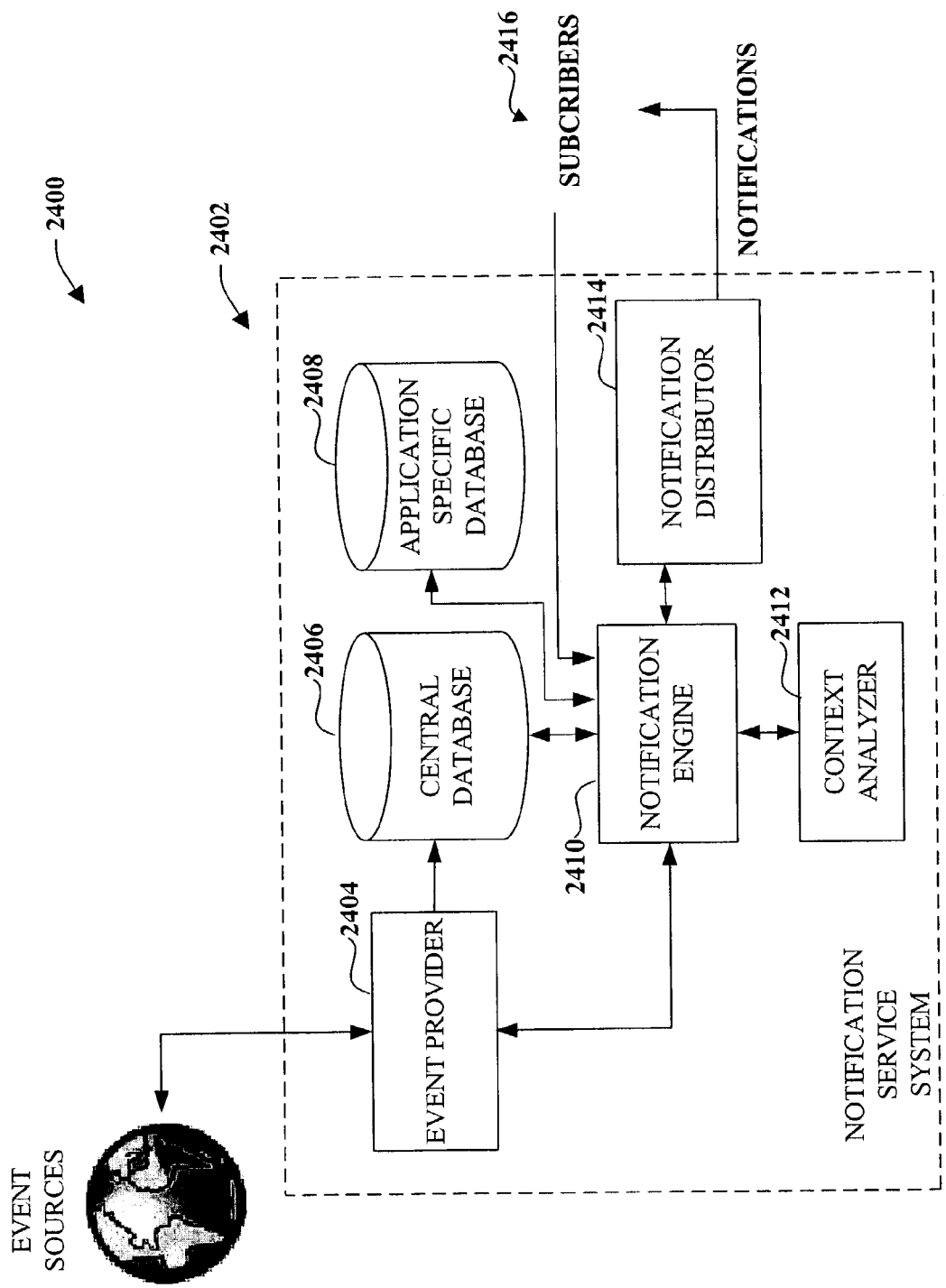
FIG. 24 is a schematic block diagram illustrating a notification service architecture in accordance with an aspect of the present invention.

Referring next to FIG. 24, a notification service architecture 2400 is illustrated in accordance with an aspect of the present invention. The architecture 2400 includes a notification services system 2402, which includes an event provider 2404, a central database 2406, an application-specific database 2408, notification engine 2410, context analyzer 2412, notification distributor 2414, and subscribers 2416. The notification services system 2402 receives input in the form of events and subscriber data, and supplies output or notification to subscribers 2416.

The event provider 2404 acquires events from event sources for the notification services system 2402. Events represent data changes in the external world. For example, a stock price at a specific time is an event, as is a sports score, or a product delivery message. Stated differently, events are items that are potentially interesting to some set of users, and such set of users define the particular input data via subscriptions. The event provider 2404 is employed to collect selected events from event sources for the notification services 2402. Moreover, the event provider 2404 can collect event data from a plurality of different sources including but not limited to communications, such as Internet and network-based communications, and telephony communications, as well as software services, XML files, applications, and databases.

Event sources are defined generally herein as that which generates events, which can also be referred to as notifications or alerts, intended to alert a user, or a proxy for the user, about information, services, and/or a system or world event. An event source can also be referred to as a notification source. Furthermore, the event provider 2404 can monitor and gather data through various methods. Exemplary methods of gathering data include but are not limited to, monitoring directories for file additions, checking system and application log files for certain types of entries, trapping alerts from applications, monitoring web pages, tracking changes in database tables, and reviewing data provided by web services. In most cases, an event provider can gather data from any suitable resource, provided that an application is prepared that retrieves events from the resource. In general, there are a variety of different models that can be employed by the event provider 2404 to collect data. These models can influence how often and under what circumstances the event provider 2404 will collect events from event sources.

In addition, the event provider 2404 can be notified or provided with data in at least one of two manners. The event provider 2404 may wait for information to be "pushed" or sent to it, or it can "pull" information from a source by polling the source and gathering any new or updated data. For example, if a user desires to be notified each time a headline story on a favorite news page changes, the event provider 2404 can be implemented so that it monitors that page and searches for changes to the headline text, for example. When the text changes, the event provider 2404 can extract the new headline data for the notification services system 2402. In the above example, the event provider 2404 is responsible for gathering needed data, because the data is not provided to the event provider from the event source as would be the case with employment of a push methodology.

Furthermore, the event provider 2404 can obtain new data for the notification system 2402 based on either a schedule or on the occurrence of an event that meets pre-defined criteria. A scheduled event provider can run periodically, based on settings implemented by an application developer. The scheduled event provider will start running, retrieve and submit new event data and then hibernate until a next scheduled trigger time. An event-driven event provider can monitor an event source by running continuously. Thereafter, when data that meets a particular criteria for collection is made available the event provider will collect and submit the event. Alternatively, an event-driven event provider may only run in response to a callback function or some other external stimulus. This external function would then determine whether there is valid event data to collect, and use the event provider as the means of collecting such data. Once the event provider 2404 collects data from an external event source, it writes the data to an event table in batches and saves the event table to database 2408.

Data is preferably handled in batches for the sake of efficiency—event data and notification data are both batched. A batch, as generally defined herein, can be a set of data processed as a group. For example, an event batch can be a set of events that are submitted to notification services 2402 at one time. Events can be written to the system either individually or as a group. When a single event is written to the system and there is not an event batch open, one can be created automatically. The new event and subsequent events are then associated with this automatically created batch. The event provider that is providing these events is programmed to close the current event batch periodically, which submits this batch of events for use in notification generation. A new event batch is then created with the first new event submission, and the cycle starts again. Furthermore, when events are written to the system as a group, each group is automatically assigned an event batch. When the writing process is completed, the event batch is closed so that these events are available for notification generation processes. In one particular embodiment of the invention, the batches are atomic (e.g., either the entire batch or none of it is submitted).

Figure 25:
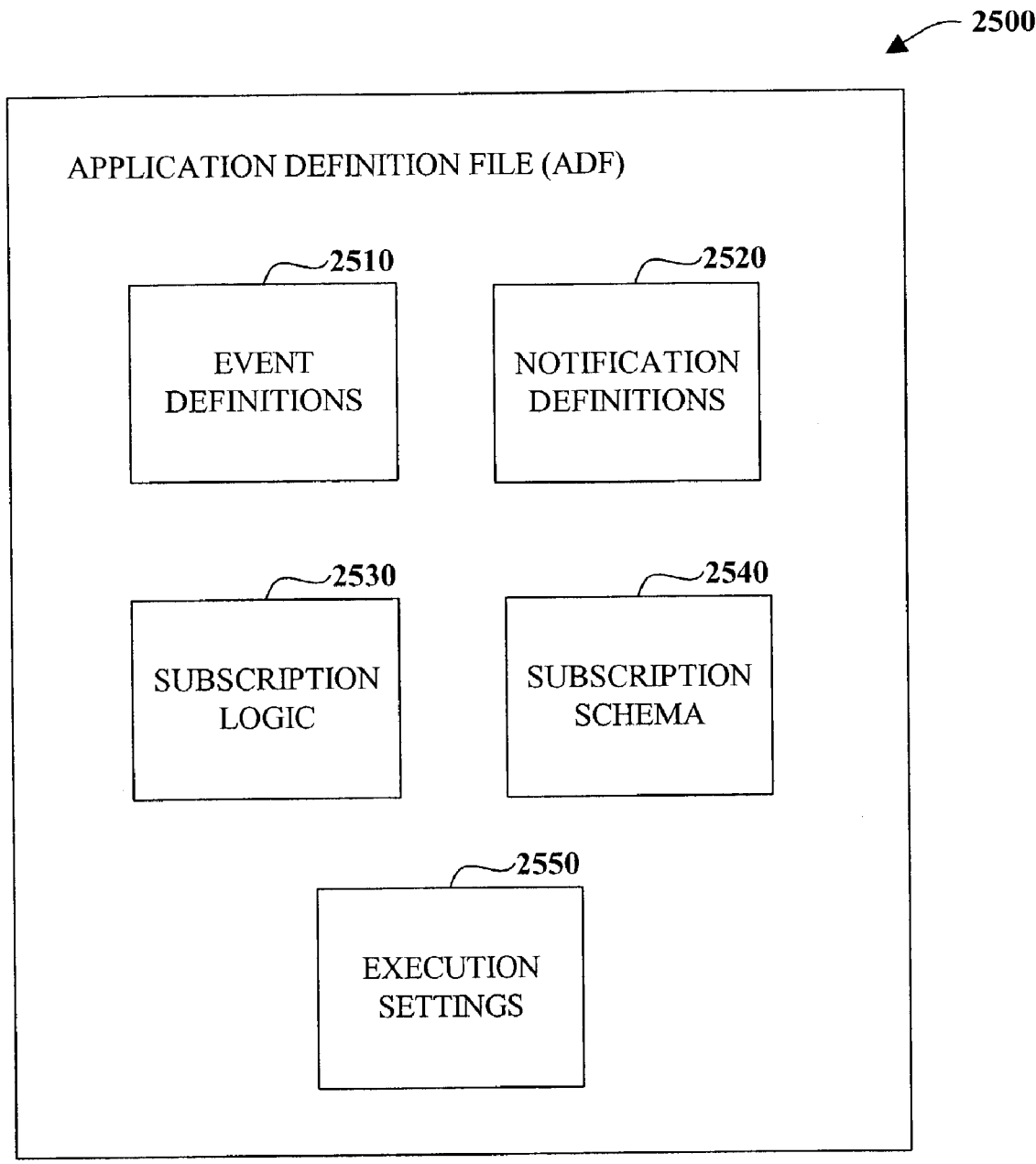
FIG. 25 is a block diagram depicting an ADF and its components in accordance with an aspect of the present invention.

Turning to FIG. 25, a block diagram depicting an ADF 2500 and its components is illustrated in accordance with an aspect of the present invention. The ADF 2500 defines central logic of the application and contains schemas for events, subscriptions, and notifications; the rules for matching events with subscriptions; and may provide the name of the file used to format generated notifications. The ADF 2500 generally includes five components: event definitions 2510, notification definitions 2520, subscription logic 2530, subscription schema 2540 and execution settings 2550. It is to be appreciated that the functionality of the various components can be combined into a lesser number of components or extrapolated into a larger set.

The event definitions 2510 specify structure of event data, the event providers that collect the data, and the structure of any event chronicles used by the application. The notification definitions 2520 specify the structure of raw notification data, the formatting for the messages that will be sent to subscribers, and the delivery protocols used to send the messages. The subscription logic 2530 defines how subscriptions are evaluated. Transact-SQL statements, for example, may match subscriptions to events, or evaluate subscriptions at certain recurring times. Additionally, subscription logic 2530 can be parameterized in a well-defined manner, so that individual subscriptions can personalize the subscription logic. Further, the subscription schema 2540 defines the structure of the subscription parameters, and evaluation times define when subscriptions are to be evaluated. Finally, the execution settings 2550 allow an application developer to enhance behavior and performance of the application when executed by notification services.

Additionally, the application developer may define application settings in several sections of the application definition file (ADF). These settings specify such items as the machines that host notification services, and execution schedules for notification services functions—they also document metadata about the ADF itself. This includes the structure of the events and subscriptions that the application accepts as input, and the structure of the notifications it produces. Examples of such metadata, described in detail below, include but are not limited to generator settings, distributor settings, vacuuming, version settings, notification history, application database information, application executing settings, and distributor information.

The notification services component 2320 (FIG. 23) includes a generator component (not shown) within the notification engine 2410 (FIG. 24) that matches events to subscriptions and ultimately produces notifications. Generator setting considerations may be defined in a <Generator> node in the ADF. One consideration that should be taken into account is how many threads the generator may use to process event batches. Such a factor can be considered a trade-off between improving application speed and monopolizing system resources. Part of such consideration is evaluating how much benefit can be gained by adding more threads. It is appreciated that some operations do not lend themselves to better efficiency through parallelism and may sometimes become less efficient. To indicate this information, a value can be specified for in a <ThreadPoolSize> element in the <Generator> node.

Functionally, the notification services generator attempts to execute event chronicle rules in parallel, followed by subscription rules (both event rules and scheduled rules). The generator will attempt to utilize threads available within the thread pool while executing rules. However, it should be noted that the generator should not execute event chronicle rules in parallel.

Figure 26:
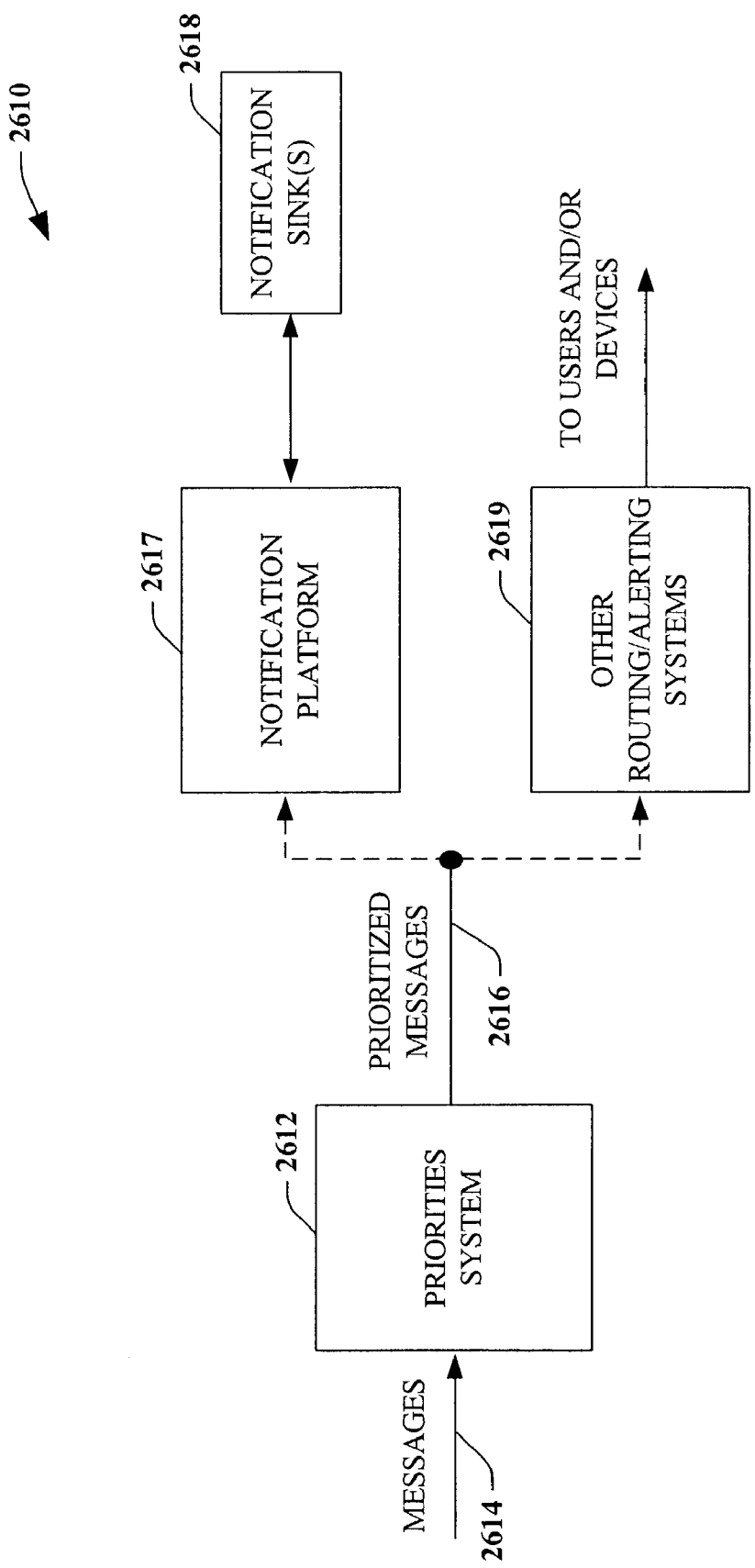
FIG. 26 is a schematic block diagram of a priorities system in accordance with an aspect of the present invention.

Referring to FIG. 26, a system 2610 illustrates a priorities system 2612 and notification architecture in accordance with an aspect of the present invention. The priorities system 2612 receives one or more messages or notifications 2614, generates a priority or measure of importance (e.g., probability value that the message is of a high or low importance) for the associated message, and provides the one or more messages with an associated priority value at an output 2616. As will be described in more detail below, classifiers can be constructed and trained to automatically assign measures of priorities to the messages 2614. For example, the output 2616 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 2617 can be employed in conjunction with the priorities system 2612 to direct prioritized messages to one or more notification sinks accessible to users. As will be described in more detail below, the notification platform 2617 can be adapted to receive the prioritized messages 2616 and make decisions regarding when, where, and how to notify the user, for example. As an example, the notification platform 2617 can determine a communications modality (e.g., current notification sink 2618 of the user such as a cell phone, or Personal Digital Assistant (PDA)) and likely location and/or likely focus of attention of the user. If a high importance e-mail were received, for example, the notification platform 2617 can determine the users location/focus and direct/reformat the message to the notification sink 2618 associated with the user. If a lower priority message 2616 were received, the notification platform 2617 can be configured to leave the e-mail in the user's in-box for later review as desired, for example. As will be described in more detail below, other routing and/or alerting systems 2619 may be utilized to direct prioritized messages 2616 to users and/or other systems.

Figure 27:
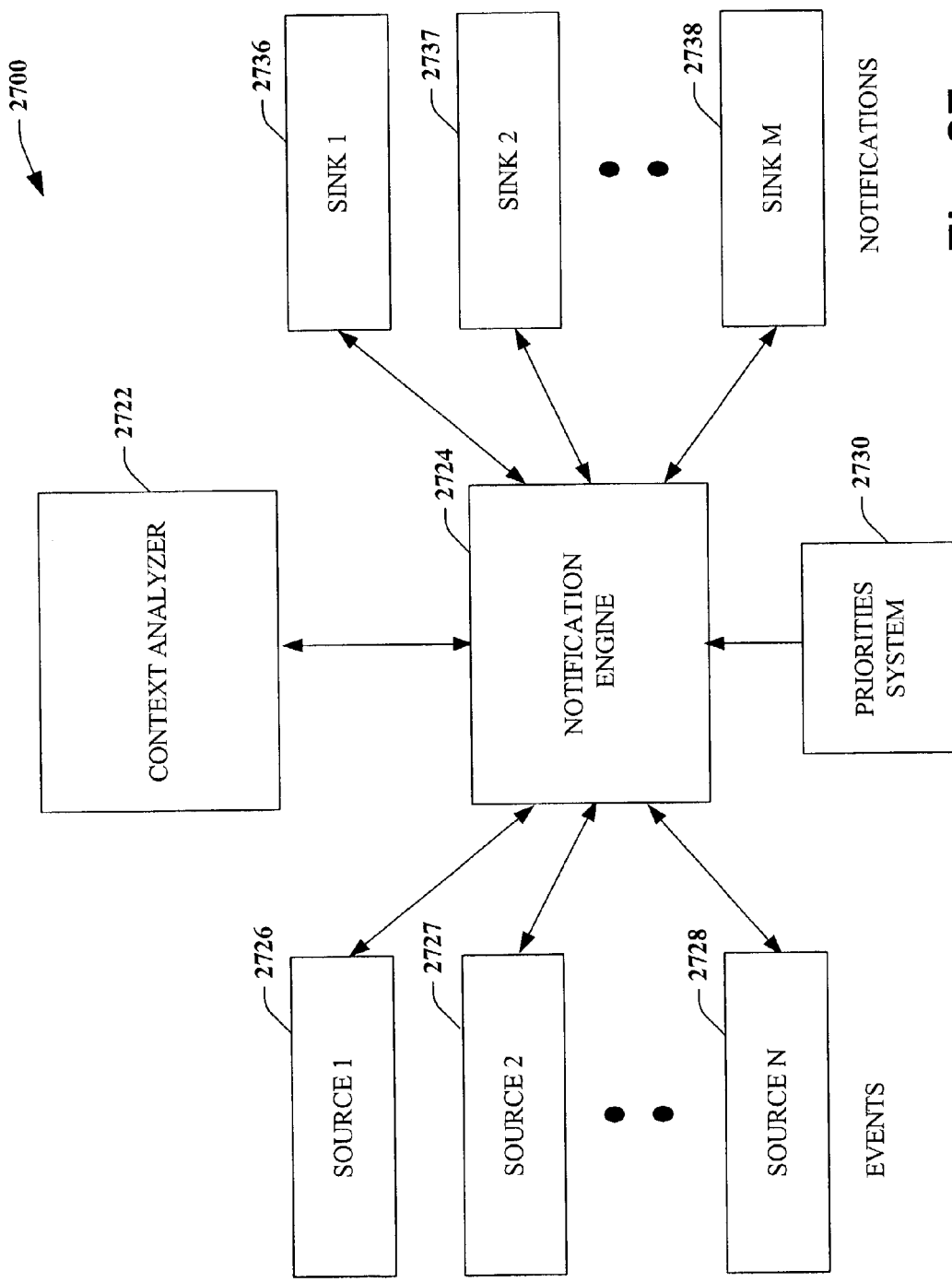
FIG. 27 is a schematic block diagram illustrating systematic cooperation between a notification engine and a context analyzer according to an aspect of the present invention.

Turning now to FIG. 27, a system 2700 illustrates how the notification engine and context analyzer function together according to an aspect of the present invention. The system 2700 includes a context analyzer 2722, a notification engine 2724, one or more notification sources 1 through N, 2726, 2727, 2728, a priorities system 2730, which can operate as a notification source, and one or more notification sinks, 1 through M, 2736, 2737, 2738, wherein N and M are integers, respectively. The sources are also referred to as event publishers, while the sinks are also referred to as event subscribers. There can be any number of sinks and sources. In general, the notification engine 2724 conveys notifications, which are also referred to as events or alerts, from the sources 2726-2728 to the sinks 2736-2738, based in part on parametric information stored in and/or accessed by the context analyzer 2722.

The context analyzer 2722 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 2724, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 2722, according to one aspect of the present invention is inclusive of contextual information determined by the analyzer. The contextual information is determined by the analyzer 2722 by discerning the user's location and attentional status based on one or more contextual information sources (not shown), as is described in more detail in a later section of the description. The context analyzer 2722, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 2726-2728, 2730 generate notifications intended for the user and/or other entity. For example, the sources 2726-2728 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the priorities system 2730 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 2726-2728 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;
computer systems (e.g., that may alert the user with messages that information about alerts about system activity or problems);
Internet-related services, appointment information, scheduling queries;
changes in documents or numbers of certain kinds of documents in one or more shared folders;
availability of new documents in response to standing or persistent queries for information; and/or,
information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 2736-2738 are able to provide notifications to the user. For example, such notification sinks 2736-2738 can include computers, such as desktop and/or laptop computers, handheld computers, cell phones, landline phones, pagers, automotive-based computers, as well as other systems/applications as can be appreciated. It is noted that some of the sinks 2736-2738 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 2724 accesses the information stored and/or determined by the context analyzer, and determines which of the notifications received from the sources 2726-2728 to convey to which of the sinks 2736-2738. Furthermore, the notification engine 2724 can determine how the notification is to be conveyed, depending on which of the sinks 2736-2738 has been selected to send the information to. For example, it may be determined that notifications should be summarized before being provided to a selected sinks 2736-2738.

The invention is not limited to how the engine 2724 makes its decisions as to which of the notifications to convey to which of the notification sinks, and in what manner the notifications are conveyed. In accordance with one aspect, a decision-theoretic analysis can be utilized. For example, the notification engine 2724 can be adapted to infer important uncertainties about variables including a user's location, attention, device availability, and amount of time until the user will access the information if there were no alert. The notification engine 2724 can then make notification decisions about whether to alert a user to a notification, and if so, the nature of the summarization and the suitable device or devices to employ for relaying the notification. In general, the notification engine 2724 determines the net expected value of a notification. In doing so, it can consider the following:

the fidelity and transmission reliability of each available notification sink;
the attentional cost of disturbing the user;
the novelty of the information to the user;
the time until the user will review the information on his or her own;
the potentially context-sensitive value of the information; and/or,
the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 2724 can make decisions as to one or more of the following:

what the user is currently attending to and doing (based on, for example, contextual information);
where the user currently is;
how important the information is;
what is the cost of deferring the notification;
how distracting would a notification be;
what is the likelihood of getting through to the user; and,
what is the fidelity loss associated with the use of a specific mode of a given notification sink.

Therefore, the notification engine 2724 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

Furthermore, the notification engine 2724 can access information stored in a user profile by the context analyzer 2722 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 2724 determines how and whether to notify the user.

According to one aspect of the present invention, the notification platform architecture 2700 can be configured as a layer that resides over an eventing or messaging infrastructure. However, the invention is not limited to any particular eventing infrastructure. Such eventing and messaging systems and protocols can include:

HyperText Transport Protocol (HTTP), or HTTP extensions as known within the art;
Simple Object Access Protocol (SOAP), as known within the art;
Windows Management Instrumentation (WMI), as known within the art;
Jini, as known within the art; and,
substantially any type of communications protocols, such as those based on packet-switching protocols, for example.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks receive notifications, alerts and events, for example. The present invention is not so limited, however.

Figure 28:
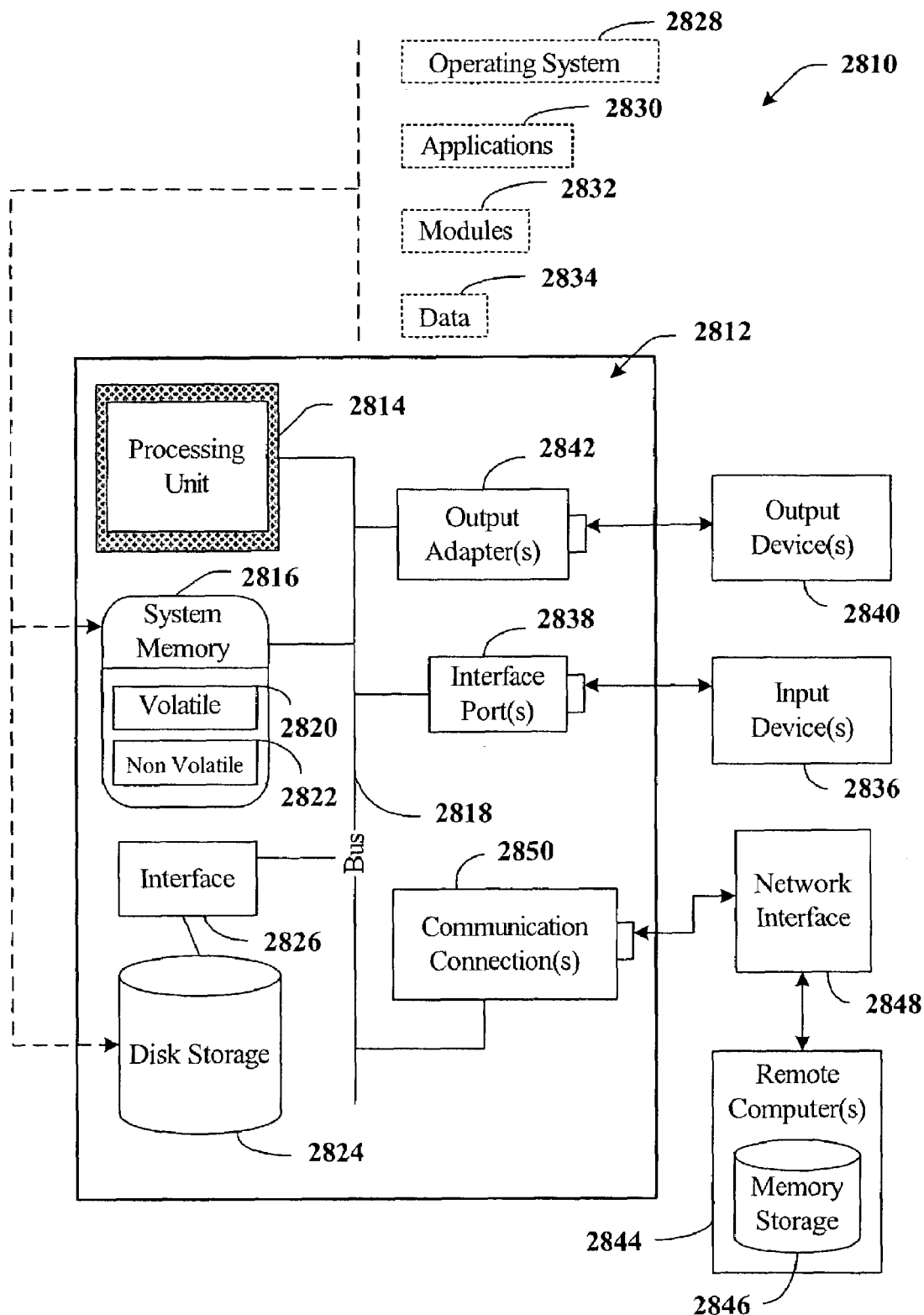
FIG. 28 is a schematic block diagram illustrating a suitable operating environment in accordance with an aspect of the present invention.

With reference to FIG. 28, an exemplary environment 2810 for implementing various aspects of the invention includes a computer 2812. The computer 2812 includes a processing unit 2814, a system memory 2816, and a system bus 2818. The system bus 2818 couples system components including, but not limited to, the system memory 2816 to the processing unit 2814. The processing unit 2814 can be any of various available processors. Dual microprocessors and other multiprocessor architectures also can be employed as the processing unit 2814.

The system bus 2818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2816 includes volatile memory 2820 and nonvolatile memory 2822. The basic input/output system (BIOS), containing the basic routines to transfer information between elements within the computer 2812, such as during start-up, is stored in nonvolatile memory 2822. By way of illustration, and not limitation, nonvolatile memory 2822 can include read only memory (ROM), programmable ROM (PROM), electrically programmable ROM (EPROM), electrically erasable ROM (EEPROM), or flash memory. Volatile memory 2820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2812 also includes removable/non-removable, volatile/non-volatile computer storage media. FIG. 28 illustrates, for example a disk storage 2824. Disk storage 2824 includes, but is not limited to, devices like a magnetic disk drive, floppy disk drive, tape drive, Jaz drive, Zip drive, LS-100 drive, flash memory card, or memory stick. In addition, disk storage 2824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2824 to the system bus 2818, a removable or non-removable interface is typically used such as interface 2826.

It is to be appreciated that FIG. 28 describes software that acts as an intermediary between users and the basic computer resources described in suitable operating environment 2810. Such software includes an operating system 2828. Operating system 2828, which can be stored on disk storage 2824, acts to control and allocate resources of the computer system 2812. System applications 2830 take advantage of the management of resources by operating system 2828 through program modules 2832 and program data 2834 stored either in system memory 2816 or on disk storage 2824. It is to be appreciated that the present invention can be implemented with various operating systems or combinations of operating systems.

A user enters commands or information into the computer 2812 through input device(s) 2836. Input devices 2836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2814 through the system bus 2818 via interface port(s) 2838. Interface port(s) 2838 include, for example, a serial port, a parallel port, a game port, and a universal serial bus (USB). Output device(s) 2840 use some of the same type of ports as input device(s) 2836. Thus, for example, a USB port may be used to provide input to computer 2812, and to output information from computer 2812 to an output device 2840. Output adapter 2842 is provided to illustrate that there are some output devices 2840 like monitors, speakers, and printers, among other output devices 2840, that require special adapters. The output adapters 2842 include, by way of illustration and not limitation, video and sound cards that provide a means of connection between the output device 2840 and the system bus 2818. It should be noted that other devices and/or systems of devices provide both input and output capabilities such as remote computer(s) 2844.

Computer 2812 can operate in a networked environment using logical connections to one or more remote computers, such as remote computer(s) 2844. The remote computer(s) 2844 can be a personal computer, a server, a router, a network PC, a workstation, a microprocessor based appliance, a peer device or other common network node and the like, and typically includes many or all of the elements described relative to computer 2812. For purposes of brevity, only a memory storage device 2846 is illustrated with remote computer(s) 2844. Remote computer(s) 2844 is logically connected to computer 2812 through a network interface 2848 and then physically connected via communication connection 2850. Network interface 2848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2850 refers to the hardware/software employed to connect the network interface 2848 to the bus 2818. While communication connection 2850 is shown for illustrative clarity inside computer 2812, it can also be external to computer 2812. The hardware/software necessary for connection to the network interface 2848 includes, for exemplary purposes only, internal and external technologies such as, modems including regular telephone grade modems, cable modems and DSL modems, ISDN adapters, and Ethernet cards.

Figure 29:
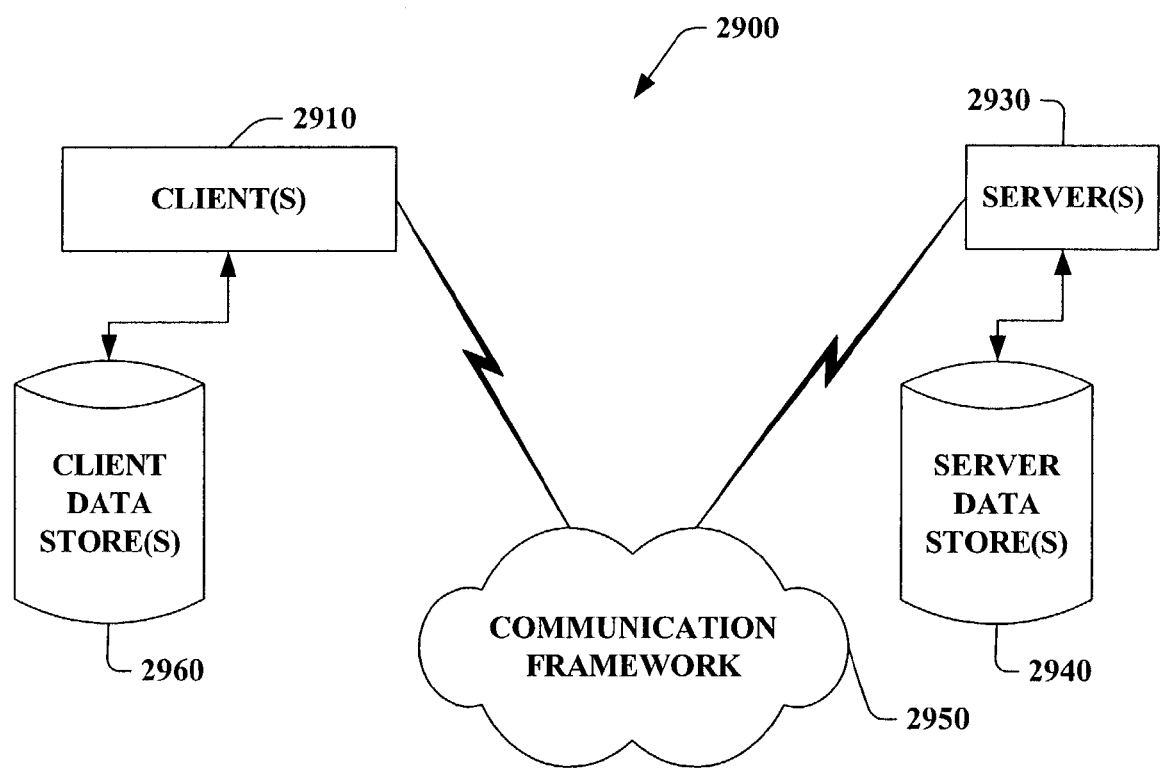
FIG. 29 is a schematic block diagram of a sample-computing environment with which the present invention can interact.

FIG. 29 is a schematic block diagram of a sample-computing environment 2900 with which the present invention can interact. The system 2900 includes one or more client(s) 2910. The client(s) 2910 can be hardware and/or software (e.g., threads, processes, computing devices). The system 2900 also includes one or more server(s) 2930. The server(s) 2930 can also be hardware and/or software (e.g., threads, processes, computing devices). The servers 2930 can house threads to perform transformations by employing the present invention, for example. One possible communication between a client 2910 and a server 2930 may be in the form of a data packet adapted to be transmitted between two or more computer processes. The system 2900 includes a communication framework 2950 that can be employed to facilitate communications between the client(s) 2910 and the server(s) 2930. The client(s) 2910 are operably connected to one or more client data store(s) 2960 that can be employed to store information local to the client(s) 2910. Similarly, the server(s) 2930 are operably connected to one or more server data store(s) 2940 that can be employed to store information local to the servers 2930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented automated tool for developing a notification system, comprising the following computer executable components stored on one or more computer readable media:

at least one application component to control portions of a notification platform, the notification platform further comprises:

a context analyzer that stores and analyzes information about a user of the notification platform gathered from a plurality of contextual sources that include one or more sensors and a statistical model that employs observations gathered through the one or more sensors and background assessments to determine the user's readiness to receive one or more notifications at one or more notification sinks; and a priorities system that generates a priority for the received notifications, sorts the prioritized notifications in accordance with the generated priority and directs the notifications to at least a notification sink selected from a plurality of notifications sinks, the notification sink selected based on the generated priority of the notifications and the user's readiness to receive the sorted notifications at the selected sink as determined by the context analyzer; and a development tool that provides visual indicators to automatically construct the at least one application component and a notification services application for the notification platform, the visual indicators provide for differentiating work done by a generator of notifications and work done by distributors of notifications.

2. The tool of claim 1, the application component is at least one of an Application Definition File (ADF), a configuration file, an assembly, a schema, virtual machine code, an SQL file, and an XML file.

3. The tool of claim 1, the development tool includes at least one of a visual editor, a class view tool, a project tool, a file view tool, a debug tool and a deployment tool.

4. The tool of claim 3, at least one of the visual editor and the class view tool can invoke a visual sub-editor to edit the application component of claim 1.

5. The tool of claim 3, the visual editor employs arrows to illustrate data flows within the notification services application of claim 1.

6. The tool of claim 5, the visual editor utilizes at least one of an iconic display of the application component and an expanded display of the application component of claim 1, the iconic display and the expanded display selectable by a user.

7. The tool of claim 6, the iconic display is depicted as a flow diagram of icons representing one or more application components diagrammatically connected via arrows.

8. The tool of claim 6, the icons include at least one of a subscription class, subscription rules, subscription chronicles, an event provider, an event class, event chronicle rules, event chronicles, a notification class, a content formatter, a delivery protocol, a generator, and a distributor.

9. The tool of claim 7, the expanded display includes an inner portion describing portions of a notification application and an outer portion that represents the notification application.

10. The tool of claim 4, the visual sub-editor provides editing functions for at least one of a subscription class, subscription rules, subscription chronicles, an event provider, an event class, event chronicle rules, event chronicles, a notification class, a content formatter, a delivery protocol, a generator, and a distributor component.

11. The tool of claim 3, the class view tool provides a hierarchical display of one or more components of a notification services application.

12. The tool of claim 11, the class view tool includes at least one of a Document editor, a Property editor, an In-line editor, an Enumeration editor, and a Custom editor.

13. The tool of claim 3, the project tool facilitates creation and management of a notification services application, the project tool is operative with a desktop development environment.

14. The tool of claim 13, the project tool employs at least one of a project file, a template file, and a template item to describe and build and describe the notification services application.

15. The tool of claim 3, the file tool displays a hierarchical representation of a notification service application within the context of a desktop development environment.

16. The tool of claim 3, the debug tool provides debug options in at least two programming languages.

17. The tool of claim 16, the debug options include setting breakpoints, stopping on break points, stepping, continuing after break, stopping on an exception or condition, inspecting application states, viewing a call stack, setting conditional breakpoints, and setting watch points to observe how an item changes.

18. The tool of claim 16, the debug tool provides debug options for at least one of an SQL component, and a virtual machine.

19. The tool of claim 3, the deployment tool includes automatic installation options that define and install one or more components of a notification services application.

20. A notification system, comprising the following computer executable means stored within computer storage media:

means for describing components of a notification application;

means for storing and discerning information regarding a user of the notification application from a plurality of contextual sources that include one or more sensors and at least a statistical model that determines receptivity of the user to receiving one or more notifications at one or more notification sinks based on background assessment and information gathered from the one or more sensors;

means for prioritizing the received notifications by assigning a measure of importance to each of the notifications;

means for sorting the prioritized notifications;

means for directing the sorted notifications to at least one selected notification sink, the at least one notification sink is selected from a plurality of notification sinks based on generated measure of importance of the notifications and the user's receptivity to receive notifications as determined by the means for storing and discerning;

means for displaying the components of the notification application and indicating regions of processing for generators and distributors of notifications;

means for visually associating the components of the notification application; and means for directing a developer to build the notification application.

21. The system of claim 20, further comprising means for debugging the notification application.

22. The system of claim 20, further comprising means for deploying the notification application.

23. The system of claim 20, further comprising means for editing the components of the notification application.

24. A computer implemented system for building a notification platform, comprising the following computer executable objects stored on one or more computer readable media:

one or more display objects representing components of a notification application, at least two of the display objects visually coupled to form the notification application wherein the notification application stores and analyzes information about a user of the notification platform gathered from various contextual sources that include one or more sensors and a statistical model that employs its background assessment and data from the one or more sensors to discern the user's readiness to receive one or more notifications;

the notification platform further prioritizes the received notifications, sorts the notifications based on the prioritization and directs the sorted messages to one or more selected notification sinks, wherein the notification sinks are selected based on the sorting and the users readiness to receive the notification at the selected sinks, and one or more editors that can be activated by selecting the display objects in order to at least one of build and modify the notification application, the one or more editors visually differentiate components for generators of notifications from components for distributors of notifications.

25. The system of claim 24, the display objects are represented as an icon, the icon being expanded upon action by a user.

26. The system of claim 24, further comprising at least one of a debug option, a class view option, a project management option, a file view option, and a deployment option.

27. The system of claim 26, the debug options includes providing troubleshooting options for at least two debug engines.

28. The system of claim 26, the class view option can invoke one or more of the editors of claim 24.

29. The system of claim 24, the one or more editors employed to edit at least one of a subscription class, subscription rules, subscription chronicles, an event provider, an event class, event chronicle rules, event chronicles, a notification class, a content formatter, a delivery protocol, a generator, and a distributor component.

30. The system of claim 24, the notification application generates a large number of notifications at a time from event sources to notification sinks by performing a join operation on databases associated with events data and subscription data and by defining at least a parameterized query that takes one or more individual subscriptions as parameter data.

31. The tool of claim 1, the visual indicators provide a first block that includes work done by a generator of notifications and a second block that includes work that is done by distributors of notifications.

* * * * *

UNITED STATES PATENT AND TRADEMARK OFFICE
CERTIFICATE OF CORRECTION

| | | |
|---|---|---|
| PATENT NO. | : 7,360,202 B1 | Page 1 of 1 |
| APPLICATION NO. | : 10/375300 | |
| DATED | : April 15, 2008 | |
| INVENTOR(S) | : Praveen Seshadri et al. | |

It is certified that error appears in the above-identified patent and that said Letters Patent is hereby corrected as shown below:

In column 38, line 66, in Claim 24, delete "sorted messages" and insert -- sorted notifications --, therefor.

In column 39, line 1, in Claim 24, delete "sorting" and insert -- sorted notification --, therefor.

In column 39, line 2-3, in Claim 24, delete "sinks, and" and insert -- sinks as determined by the notification application, and --, therefor.

Signed and Sealed this
Fifteenth Day of February, 2011

David J. Kappos
*Director of the United States Patent and Trademark Office*